(12) United States Patent
Takahashi et al.

(10) Patent No.: US 7,330,449 B2
(45) Date of Patent: Feb. 12, 2008

(54) MOBILE NODE, MOBILITY CONTROL APPARATUS, COMMUNICATION CONTROL METHOD, COMMUNICATION SYSTEM, AND DATA FORMAT

(75) Inventors: Hideaki Takahashi, Yokohama (JP); Koji Omae, Yokohama (JP); Masahiro Inoue, Yokosuka (JP); Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 850 days.

(21) Appl. No.: 10/737,868

(22) Filed: Dec. 18, 2003

(65) Prior Publication Data

US 2004/0218573 A1    Nov. 4, 2004

(30) Foreign Application Priority Data

Dec. 19, 2002  (JP)  ............................ P2002-368610

(51) Int. Cl.
*H04Q 7/00*  (2006.01)

(52) U.S. Cl. ................... 370/331; 370/338; 370/401
(58) Field of Classification Search .................... None
See application file for complete search history.

(56) References Cited

U.S. PATENT DOCUMENTS

| | | | | |
|---|---|---|---|---|
| 6,515,974 | B1 * | 2/2003 | Inoue et al. ............... | 370/331 |
| 6,636,498 | B1 * | 10/2003 | Leung ....................... | 370/338 |
| 6,930,988 | B2 * | 8/2005 | Koodli et al. ............. | 370/331 |
| 2001/0046223 | A1 | 11/2001 | Malki et al. | |
| 2002/0157024 | A1 | 10/2002 | Yokote | |

FOREIGN PATENT DOCUMENTS

| | | |
|---|---|---|
| JP | 2001-258058 | 9/2001 |
| WO | WO 01/76286 A1 | 10/2001 |

OTHER PUBLICATIONS

S. Deering, et al., Network Working Group Request For Comments: 2460, pp. 1-34, "Internet Protcal, Version 6 (IPV6) Specification", Dec. 1998.

D. B. Johnson, et al., IETF Mobile IP Working Group Internet Draft, pp. 1-145, "Mobility Support in IPV6 <draft-ietf-mobileip-ipv6-18. txt>", Jun. 1, 2002.

(Continued)

*Primary Examiner*—Chau Nguyen
*Assistant Examiner*—Dargaye H Churnet
(74) *Attorney, Agent, or Firm*—Oblon, Spivak, McClelland, Maier & Neustadt, P.C.

(57) ABSTRACT

An object of the present invention is to decrease a care-of address update duration in switching of a link used for connection to an IP network by a mobile node (MN). MN acquires a list of access routers (ARs) existing on neighboring links to the link used for connection by the mobile node and creates a list of care-of addresses (CoAs) corresponding to the respective ARs entered in the list, each CoA being used as a destination of MN at a link on which an AR corresponding thereto exists. After the change of the connected link, MN acquires a data link layer address of AR existing on the link after the change and detects a default router on the basis of the address with reference to the access node list. Furthermore, MN detects a CoA with a network prefix corresponding with a subnet prefix of the default router, as a primary CoA and requests MAP to register a binding between the primary CoA and HoA.

21 Claims, 17 Drawing Sheets

OTHER PUBLICATIONS

H. Soliman, et al., IETF Mobile IP Working Group Internet-Draft, pp. 1-31, "Hierarchical MIPV6 Mobility Management (HMIPV6) <draft-ietf-mobileip-hmipv6-06. txt>", Jul. 2002.

T. Narten, et al., Network Working Group Request For Comments: 2461, pp. 1-79, "Neighbor Discovery for IP Version 6 (IPV6)", Dec. 1998.

* cited by examiner

FORMAT OF BU MESSAGE CONTAINING ACCESS NODE LIST REQUEST FLAG

Fig. 7 FORMAT OF ACCESS NODE LIST IN FIRST EMBODIMENT

| SEQUENCE NO. | NETWORK LAYER ADDRESS OF AR AND VALID DURATION | DATA LINK LAYER ADDRESS OF AR AND VALID DURATION |
|---|---|---|
| 1 | NW ADDRESS AR1,1200 | DL ADDRESS AR1,1200 |
| 2 | NW ADDRESS AR2,2400 | DL ADDRESS AR2,8400 |
| 3 | NW ADDRESS AR3,3600 | DL ADDRESS AR3,9600 |
| ... | ... | ... |
| n−1 | NW ADDRESS ARn-1,720 | DL ADDRESS ARn-1,960 |
| n | NW ADDRESS ARn,600 | DL ADDRESS ARn,600 |

FORMAT OF BA CONTAINING ROUTER ADDRESS ADVERTISEMENT OPTION

*Fig.10*

FORMAT OF CoA LIST

| SEQUENCE NO. | | CoA | VALID DURATION |
|---|---|---|---|
| 1 | PRIMARY | CoA-AR1 | 1200 |
| 2 | | CoA-AR2 | 3600 |
| 3 | | CoA-AR3 | 7200 |
| ... | | ... | ... |
| n−1 | | CoA-ARn-1 | 240 |
| n | | CoA-ARn | 60 |

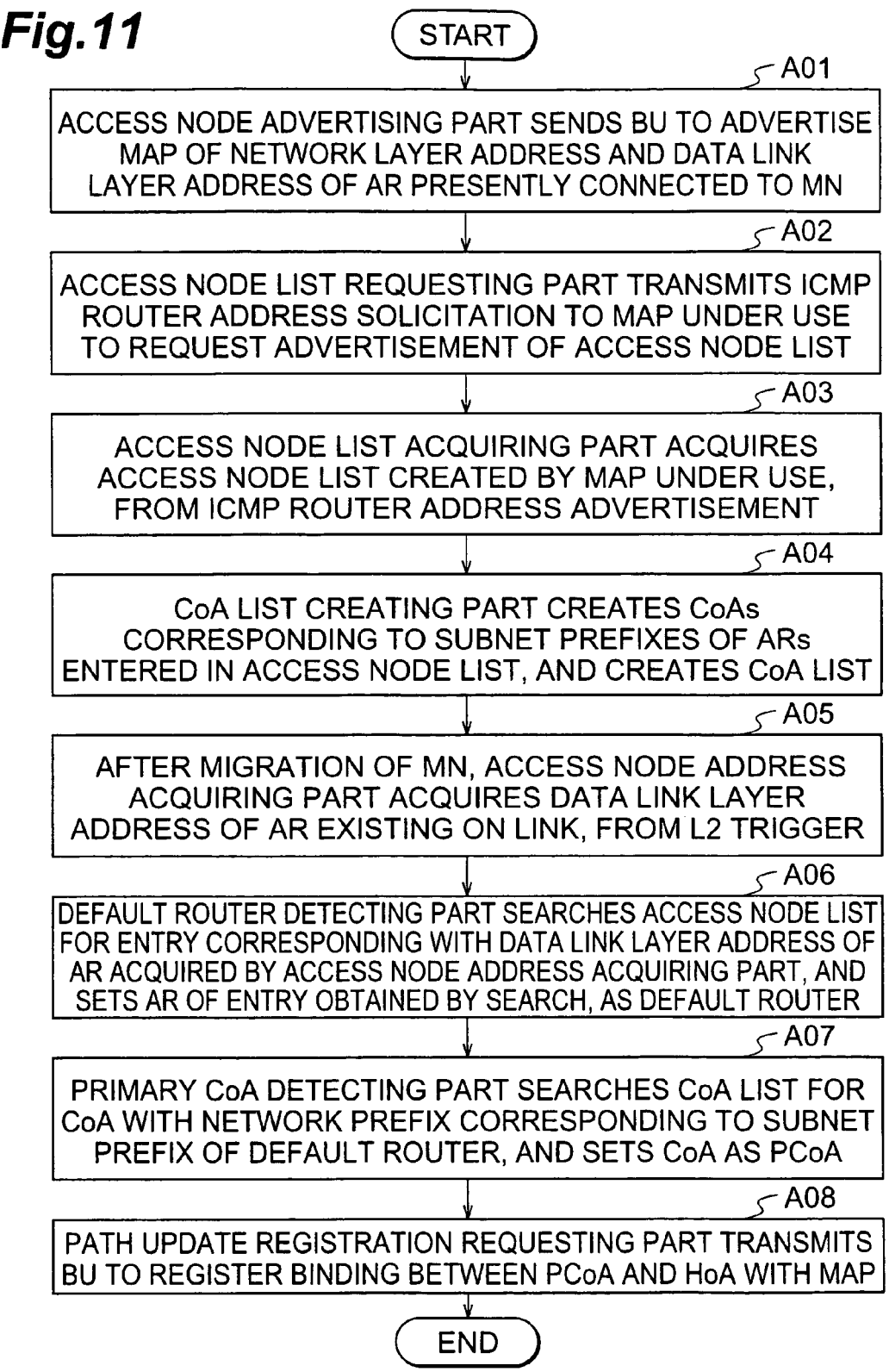

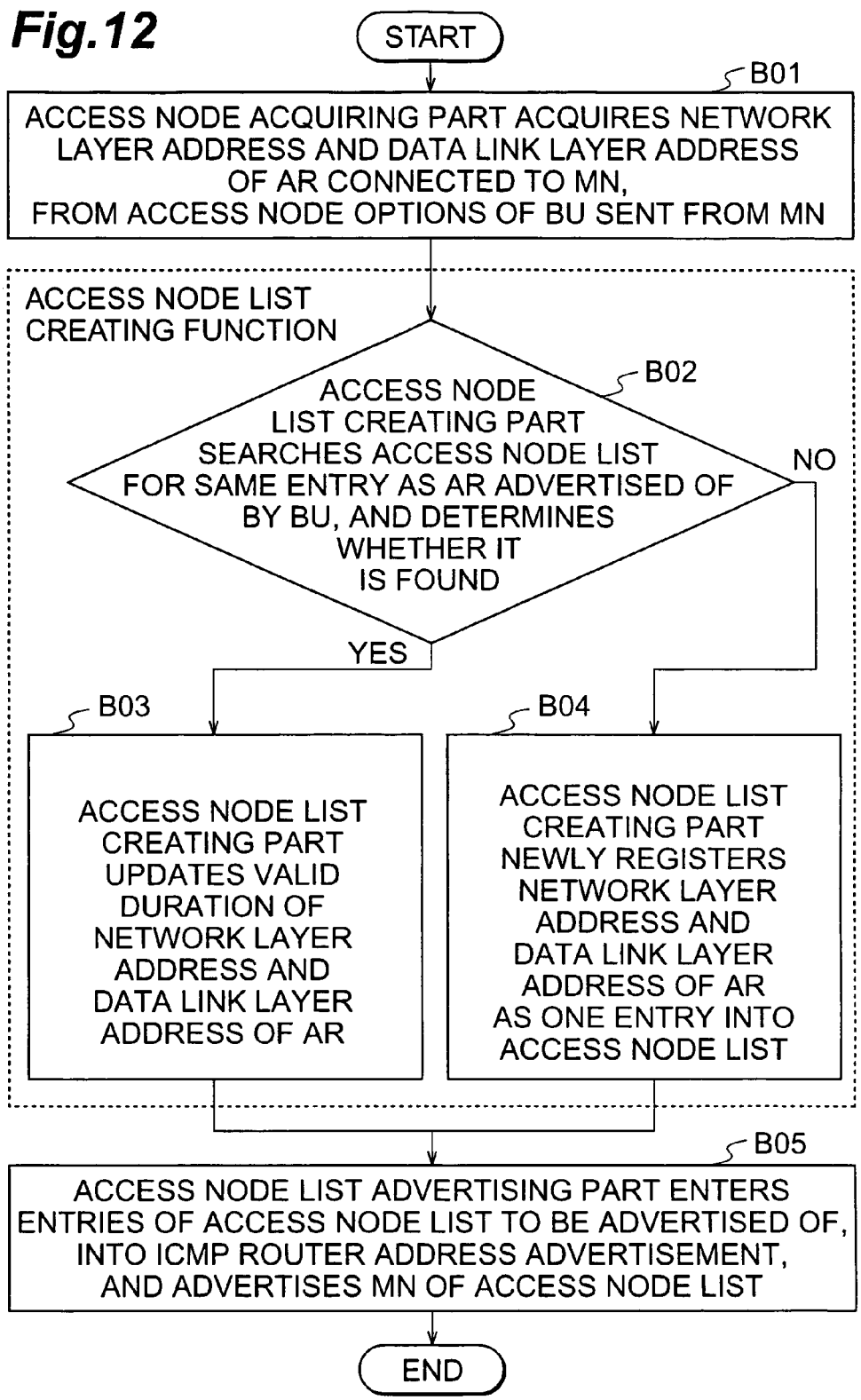

Fig.15   FORMAT OF ACCESS NODE LIST IN SECOND EMBODIMENT

| SEQUENCE NO. | NETWORK LAYER ADDRESS OF AR AND VALID DURATION | DATA LINK LAYER ADDRESS OF AR AND VALID DURATION | DATA LINK LAYER ADDRESS OF AP AND VALID DURATION |
|---|---|---|---|
| 1 | NW ADDRESS AR1, 1200 | DL ADDRESS AR1, 1200 | DL ADDRESS AP1, 1200 |
| 2 | NW ADDRESS AR2, 2400 | DL ADDRESS AR2, 8400 | DL ADDRESS AP2, 4800 |
| 3 | NW ADDRESS AR3, 3600 | DL ADDRESS AR3, 9600 | DL ADDRESS AP3, 8400 |
| ... | ... | ... | ... |
| n−1 | NW ADDRESS ARn-1, 720 | DL ADDRESS ARn-1, 960 | DL ADDRESS APn-1, 2400 |
| n | NW ADDRESS ARn, 600 | DL ADDRESS ARn, 600 | DL ADDRESS APn, 3600 |

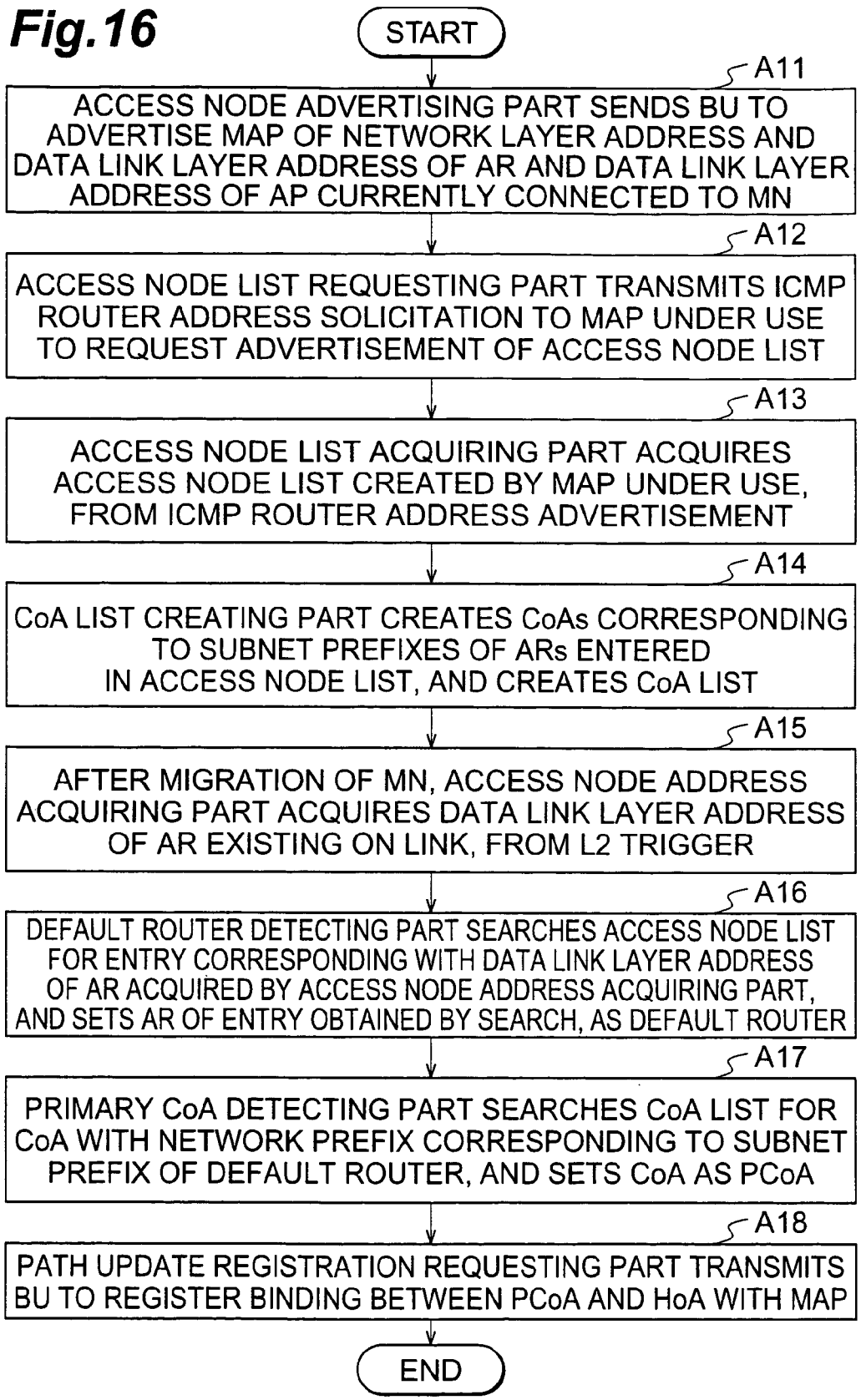

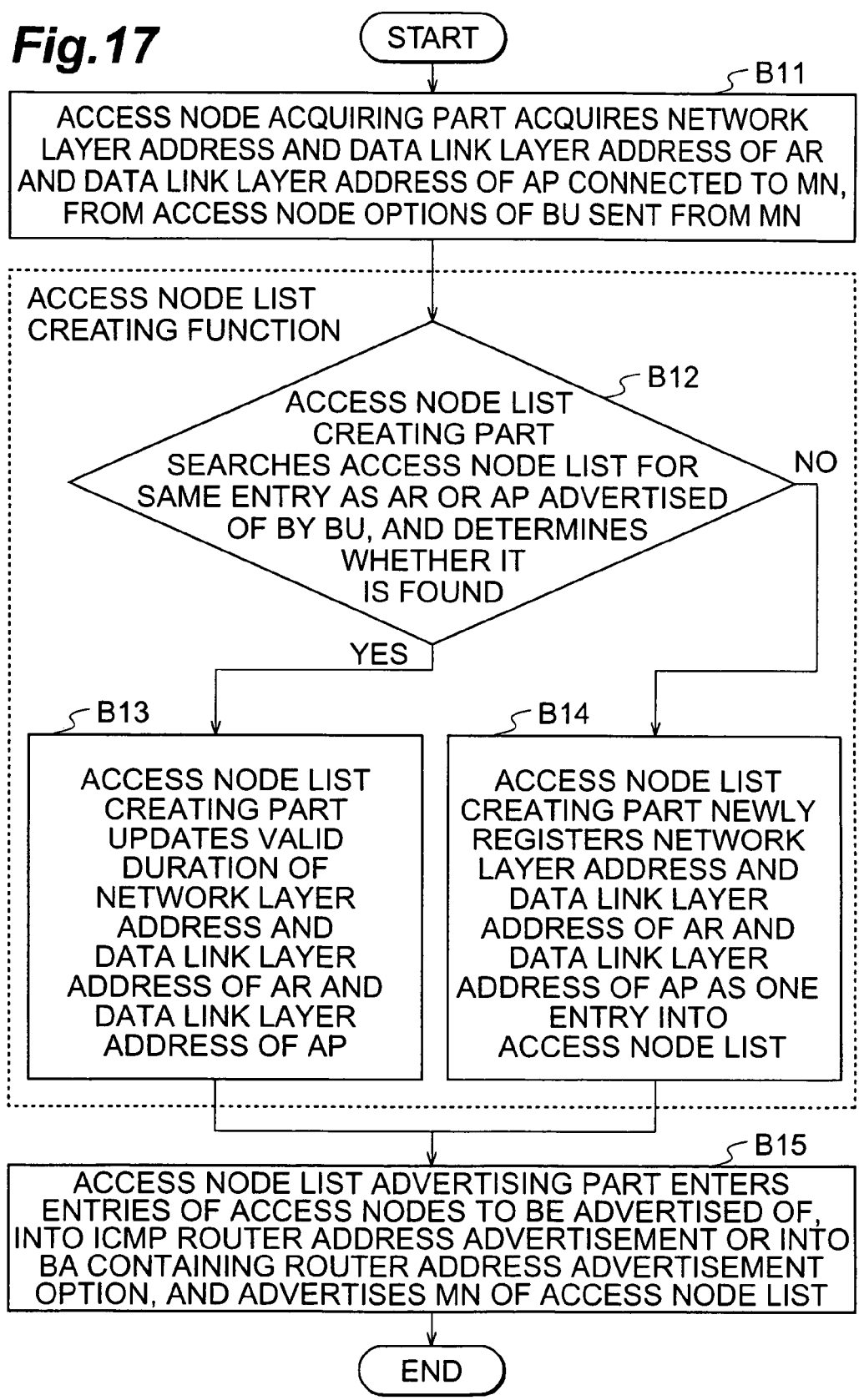

MOBILE NODE, MOBILITY CONTROL APPARATUS, COMMUNICATION CONTROL METHOD, COMMUNICATION SYSTEM, AND DATA FORMAT

BACKGROUND OF THE INVENTION

1. Field of the Invention

The present invention relates to the technology concerning Internet Protocol version 6 (IPv6) and, more particularly, to a mobile node, a mobility control apparatus, a communication control method, a communication system, and a data format.

2. Related Background Art

In the Internet through Internet Protocol version 6 (IPv6) (for example, reference is made to "S. Deering and R. Hinden, "Internet Protocol, Version 6 (IPv6) Specification", Request For Comments 2460, December, 1998"), Mobile IPv6 (e.g., reference is made to "C. Perkins and D. B. Johnson, "Mobility Support in IPv6", draft-ietf-mobileip-ipv6-18.txt, June, 2002") is presented as a conventional technique enabling a node to maintain communication with a correspondent node even if it successively changes connected links with movement. Mobile IPv6 provides definitions of Mobile Node (MN) which is a node moving on the Internet, and Home Agent (HA) which exists on a predetermined link of Internet and which forwards a packet addressed to MN, to MN. MN uses a Home Address (HoA) determined from a link on which HA used by itself exists, and a Care-of Address (CoA) determined from a link on which MN itself exists at present. MN updates the CoA to another upon every migration. Then MN sends a Binding Update (BU) message to HA to advertise HA of a binding indicating a correspondence between the HoA and the new CoA. HA puts a packet addressed to the HoA of MN, which was sent from a correspondent of MN, into a packet addressed to the new CoA indicated by the binding, and forwards it to the CoA. Mobile IPv6 guarantees communication between MN and the correspondent node by the above-described operation.

HA continues forwarding packets to the old CoA, before MN migrates to switch its link connected to the Internet and then update the CoA to the new and before HA updates the binding of MN under its management. After completion of the binding update process, HA starts forwarding packets to the new CoA. Since packets having been forwarded to the old CoA are forwarded to the link used for connection before the migration by MN, they are not received by MN to end in burst packet loss.

In order to decrease the duration of the binding update process leading to the burst packet loss, there is a proposal to implement Hierarchical Mobile IPv6 adopting Mobility Anchor Point (MAP) between HA and MN (e.g., reference is made to "H. Soliman, et al., "Hierarchical MIPv6 mobility management (HMIPv6)", draft-ietf-mobileip-hmipv6-06.txt, July, 2002"). In Hierarchical Mobile IPv6, HA manages the binding between HoA and MAP address, and MAP the binding between HoA and CoA. When MN switches its connected link in an identical MAP domain, there is no need for updating the binding managed by HA and it is sufficient to updating only the binding managed by MAP. Since a transmission delay between MN and MAP is smaller than that between MN and HA, the binding update duration with MAP becomes shorter than that with HA. Therefore, in switching the connected link in the same MAP domain, Hierarchical Mobile IPv6 can decrease the burst packet loss more than Mobile IP.

SUMMARY OF THE INVENTION

However, Hierarchical Mobile IPv6 achieves no decrease of the CoA update duration which is another factor to cause the burst packet loss. MN becomes able to update the CoA after it receives a Router Advertisement (RA) message from an Access Router (AR) existing on the connected link to detect a default router. MN can receive the RA either by receiving the RA transmitted at regular intervals by the access router or by sending a Router Solicitation (RS) message to the access router on the connected link by itself to request transmission of the RA. With reception of the request to transmit RA by RS from MN, however, the access router will not transmit it at once, but will transmit the RA with addition of a random transmission delay of at most 500 [msec] (e.g., reference is made to "T. Narten, et al., "Neighbor Discovery for IP version 6 (IPv6)", Request For Comments 2461, December, 1998"). Therefore, the CoA update takes the time of at most 500 [msec].

The present invention has been accomplished in order to solve the above problem, and an object of the invention is to provide a mobile node, a mobility control apparatus, a communication control method, a communication system, and a data format capable of reducing the CoA update duration necessary between establishment of a connection of the mobile node with a data link layer and completion of the CoA update when the mobile node switches a link connected to the IP network, to another.

In order to achieve the above object, a mobile node according to the present invention is a mobile node making up a communication system based on Internet Protocol version 6, together with a mobility control apparatus for managing movement of the mobile node, and with an access node providing a link for the mobile node to be connected to a packet communication network, the mobile node comprising: list acquiring means for acquiring a list of access nodes existing on neighboring links to the link used for connection by the mobile node; care-of address (CoA) list creating means for creating a list of CoAs corresponding to the respective access nodes entered in the acquired access node list, each CoA being used as a destination address of the mobile node at a link on which an access node corresponding thereto exists; access node address acquiring means for, where the mobile node changes the connected link to another link, acquiring a data link layer address of an access node existing on the link after the change; default router detecting means for detecting a default router on the basis of the acquired data link layer address with reference to the access node list; primary CoA detecting means for detecting a CoA with a network prefix corresponding with a subnet prefix of the default router, as a primary CoA from the list of CoAs; and path update requesting means for requesting the mobility control apparatus to update a path of a packet addressed to the mobile node, by the primary CoA.

In this mobile node, the list acquiring means acquires the list of access nodes existing on the neighboring links to the link used for connection by the mobile node and, the CoA list creating means creates the list of CoAs corresponding to the respective access nodes entered in the access node list thus acquired, each CoA being used as a destination of the mobile node at a link on which an access node corresponding thereto exists. When the mobile node changes its connected link to another, the access node address acquiring means then acquires the data link layer address of the access node existing on the link after the change and the default router detecting means detects the default router on the basis of the data link layer address acquired with reference to the access node list. Furthermore, the primary CoA detecting means detects the CoA with the network prefix corresponding with the subnet prefix of the default router, as a primary CoA from the list of CoAs, and the path update requesting means requests the mobility control apparatus to update the path of the packet addressed to the mobile node, by the primary CoA.

As described above, after the change of the connected link, the mobile node detects the default router and primary CoA, based on the access node list of access nodes existing on the neighboring links, held in advance, and on the CoA list, and requests the mobility control apparatus to update the path of the packet addressed to the mobile node, by the primary CoA. For this reason, upon a change of the connected link, the mobile node is able to instantaneously send the update request for update of the CoA to the mobility control apparatus, whereby it is feasible to significantly decrease the CoA update duration necessary between establishment of the connection of the mobile node with the data link layer, and completion of the update of the CoA.

The list acquiring means comprises: access node advertising means for advertising the mobility control apparatus of information about the access node existing on the link used for connection by the mobile node; access node list requesting means for requesting the mobility control apparatus to send the list of access nodes existing on the neighboring links to the link used for connection by the mobile node; and access node list acquiring means for acquiring the list of access nodes on the neighboring links, which was created by the mobility control apparatus, from the mobility control apparatus.

Namely, in the list acquiring means, the access node advertising means advertises the mobility control apparatus of the information about the access node existing on the link used for connection by the mobile node. The mobility control apparatus, receiving this advertisement, becomes able to create the access node list in which access nodes are registered. Then the access node list requesting means requests the mobility control apparatus to send the access node list of access nodes existing on the neighboring links to the link used for connection by the mobile node, and the access node list acquiring means is able to acquire the access node list of access nodes on the neighboring links thus created by the mobility control apparatus, from the mobility control apparatus.

The above mobile node can also be constructed in either of configurations as described below.

The access node advertising means enters the information about the access node existing on the link used for connection by the mobile node, into an access node option appended to a binding update message directed to the mobility control apparatus, thereby advertising the mobility control apparatus of the information about the access node.

The access node list requesting means requests the list of access nodes existing in the neighborhood to the link used for connection by the mobile node, using a newly defined message, or a message field appended to a binding update message directed to the mobility control apparatus.

The access node list acquiring means acquires the list of access nodes existing in the neighborhood to the link used for connection by the mobile node, using a newly defined message, or a message field appended to a binding acknowledgment message from the mobility control apparatus.

Incidentally, the above access node may be comprised of only an access router, or may be comprised of an access router, and an access point for providing an access link for the mobile node. According to such configurations of the access node, the access node advertising means, access node address acquiring means, and default router detecting means each can be constructed as follows.

Where the access node is an access router, the access node advertising means advertises the mobility control apparatus of a network layer address and a data link layer address of the access router as the information about the access node; where the access node is comprised of an access router, and an access point for providing an access link for the mobile node, the access node advertising means advertises the mobility control apparatus of a network layer address and a data link layer address of the access router, and a data link layer address of the access point as the information about the access node.

Where the access node is an access router, the access node address acquiring means acquires the data link layer address by using a predetermined information exchange message for exchange of information between an IP layer and a data link layer to advertise the IP layer of a data link layer address of the access router existing on the link after the change; where the access node is comprised of an access router, and an access point for providing an access link for the mobile node, the access node address acquiring means acquires the data link layer address by using the predetermined information exchange message to advertise the IP layer of a data link layer address of the access point existing on the link after the change.

Where the access node is an access router, the default router detecting means searches the access node list for an access router corresponding with the data link layer address of the access router acquired, and defines the access router obtained by the search, as a default router; where the access node is comprised of an access router, and an access point for providing an access link for the mobile node, the default router detecting means searches the access node list for an access router existing on a subnet identical to that of an access point existing on the link after the change, with reference to the data link layer address of the access point acquired and the access node list, and defines the access router obtained by the search, as a default router.

A mobility control apparatus according to the present invention is a mobility control apparatus for managing movement of a mobile node on the basis of Internet Protocol version 6, the mobility control apparatus comprising: access node acquiring means for acquiring information about an access node existing on a link used for connection by the mobile node; access node list creating means for creating an access node list in which access nodes for providing an access link for the mobile node are registered; and access node list advertising means for advertising the mobile node of the access node list in a domain where the mobility control apparatus is managed.

In this mobility control apparatus, the access node acquiring means acquires the information about the access node existing on the link used for connection by the mobile node, and then the access node list creating means creates the access node list in which access nodes for providing an access link for the mobile node are registered. For example, in the case where the mobility control apparatus receives a request for the access node list from the mobile node, or the like, the access node list advertising means is able to advertise the mobile node of the access node list in the domain where the mobility control apparatus is managed.

The various means described above can also be constructed as follows.

The access node acquiring means acquires the information about the access node from an access node option appended to a binding update message from the mobile node.

The access node list advertising means advertises the mobile node of the access node list, using a newly defined message, or a message field appended to a binding acknowledgment message directed to the mobile node.

The access node list advertising means advertises the mobile node of the access node list in which information is registered about access nodes existing on all links for providing an access link for the mobile node, among links in the domain where the mobility control apparatus is managed.

The access node list advertising means advertises the mobile node of the access node list in which information is registered about access nodes on neighbor links to which the mobile node can move from the link used for connection at present, with a possibility of not less than a predetermined reference.

Incidentally, the above access node may be comprised of only an access router, or may be comprised of an access router, and an access point for providing an access link for the mobile node. According to such configurations of the access node, the access node acquiring means and access node list creating means can be constructed as follows.

Where the access node is an access router, the access node acquiring means acquires a network layer address and a data link layer address of the access router as the information about the access node; where the access node is comprised of an access router, and an access point for providing an access link for the mobile node, the access node acquiring means acquires a network layer address and a data link layer address of the access router, and a data link layer address of the access point as the information about the access node.

Where the access node is an access router, the access node list creating means creates the access node list containing a network layer address and a data link layer address of the access router as one entry; where the access node is comprised of an access router, and an access point for providing an access link for the mobile node, the access node list creating means creates the access node list containing a network layer address and a data link layer address of the access router, and a data link layer address of the access point as one entry.

Incidentally, the present invention can also be taken as invention about a communication system comprising the mobile node and the mobility control apparatus, or as communication control methods in the mobile node and in the communication system.

Namely, a communication control method according to the present invention is a communication control method in a mobile node making up a communication system based on Internet Protocol version 6, together with a mobility control apparatus for managing movement of the mobile node, and with an access node providing a link for the mobile node to be connected to a packet communication network, the communication control method comprising: a list acquiring step of acquiring a list of access nodes existing on neighboring links to the link used for connection by the mobile node; a care-of address (CoA) list creating step of creating a list of CoAs corresponding to the respective access nodes entered in the acquired access node list, each CoA being used as a destination address of the mobile node at a link on which an access node corresponding thereto exists; an access node address acquiring step of, where the mobile node changes the connected link to another link, acquiring a data link layer address of an access node existing on the link after the change; a default router detecting step of detecting a default router on the basis of the acquired data link layer address with reference to the access node list; a primary CoA detecting step of detecting a CoA with a network prefix corresponding with a subnet prefix of the default router, as a primary CoA from the list of CoAs; and a path update requesting step of requesting the mobility control apparatus to update a path of a packet addressed to the mobile node, by the primary CoA.

Another communication control method according to the present invention is a communication control method in a communication system configured to implement packet communication based on Internet Protocol version 6 and comprising a mobile node, a mobility control apparatus for managing movement of the mobile node, and an access node for providing a link for the mobile node to be connected to a packet communication network, the communication control method comprising: an access node advertising step wherein the mobile node advertises the mobility control apparatus of information about the access node existing on the link used for connection by the mobile node; an access node acquiring step wherein the mobility control apparatus acquires the information about the access node from the mobile node; an access node list creating step wherein the mobility control apparatus creates an access node list in which access nodes for providing an access link for the mobile node are registered, based on the information about the access node; an access node list requesting step wherein the mobile node requests the mobility control apparatus to send a list of access nodes existing on neighboring links to the link used for connection by the mobile node; an access node list advertising step wherein the mobility control apparatus receives the request for the access node list from the mobile node and advertises the mobile node of the access node list of access nodes existing on the neighboring links; and an access node list acquiring step wherein the mobile node acquires the access node list of access nodes on the neighboring links from the mobility control apparatus.

A communication system according to the present invention is a communication system configured to implement packet communication based on Internet Protocol version 6 and comprising a mobile node, a mobility control apparatus for managing movement of the mobile node, and an access node for providing a link for the mobile node to be connected to a packet communication network, wherein the mobile node comprises: list acquiring means for acquiring a list of access nodes existing on neighboring links to the link used for connection by the mobile node; care-of address (CoA) list creating means for creating a list of CoAs corresponding to the respective access nodes entered in the acquired access node list, each CoA being used as a destination address of the mobile node at a link on which an access node corresponding thereto exists; access node address acquiring means for, where the mobile node changes the connected link to another link, acquiring a data link layer address of an access node existing on the link after the change; default router detecting means for detecting a default router on the basis of the acquired data link layer address with reference to the access node list; primary CoA detecting means for detecting a CoA with a network prefix corresponding with a subnet prefix of the default router, as a primary CoA from the list of CoAs; and path update requesting means for requesting the mobility control apparatus to update a path of a packet addressed to the mobile node, by the primary CoA.

In the above communication system, the list acquiring means of the mobile node comprises: access node advertising means for advertising the mobility control apparatus of information about the access node existing on the link used for connection by the mobile node; access node list requesting means for requesting the mobility control apparatus to send the list of access nodes existing on the neighboring links to the link used for connection by the mobile node; and access node list acquiring means for acquiring the access node list of access nodes existing on the neighboring links, from the mobility control apparatus; the mobility control apparatus comprises: access node acquiring means for acquiring the information about the access node from the mobile node; access node list creating means for creating an access node list in which access nodes for providing an access link for the mobile node are registered, based on the information about the access node; and access node list advertising means for receiving the request for the access node list from the mobile node and advertises the mobile node of the access node list of access nodes existing on the neighboring links.

The aforementioned "newly defined message" is preferably one adopting a data format as described below.

A data format according to the present invention is a data format adopted in the newly defined message as set forth in Claim 4, which is comprised of a basic header portion based on Internet Protocol version 6, and an extended header portion, wherein the basic header portion comprises: a next header configuration field for indicating that a next header is a header about ICMP version 6; a source address field for storing a CoA of the mobile node; and a destination address field for storing an address of the mobility control apparatus with which the mobile node registers a binding; wherein the extended header portion comprises: a type field for identifying the message as an ICMP router address solicitation message.

Another data format according to the present invention is a data format adopted in the newly defined message as set forth in Claim 5, which is comprised of a basic header portion based on Internet Protocol version 6, and an extended header portion, wherein the basic header portion comprises: a next header configuration field for indicating that a next header is a header about ICMP version 6; a source address field for storing an address of the mobility control apparatus; and a destination address field for storing a CoA of the mobile node; wherein the extended header portion comprises: a type field for identifying the message as an ICMP router address advertisement message; a sequence number field for storing a sequence number given according to an order of entries in the access node list held by the mobility control apparatus; a valid duration field for storing valid duration information of an address advertised of; an address storage field for storing one of a network layer address and a data link layer address of an access router, and a data link layer address of an access point; and a type field for indicating that the address stored in the address storage field is one of the network layer address and the data link layer address of the access router, and the data link layer address of the access point.

BRIEF DESCRIPTION OF THE DRAWINGS

FIG. 7 is a diagram showing a format of an access node list in the first embodiment.
FIG. 10 is a diagram showing a format of a CoA list.
FIG. 11 is a flowchart showing the operation flow of MN in the first embodiment.
FIG. 12 is a flowchart showing the operation flow of MAP in the first embodiment.
FIG. 15 is a diagram showing a format of an access node list in the second embodiment.
FIG. 16 is a flowchart showing the operation flow of MN in the second embodiment.
FIG. 17 is a flowchart showing the operation flow of MAP in the second embodiment.

DESCRIPTION OF THE PREFERRED EMBODIMENTS

A variety of embodiments according to the present invention will be described below.

First Embodiment

[Configuration of Communication System]

Figure 1:
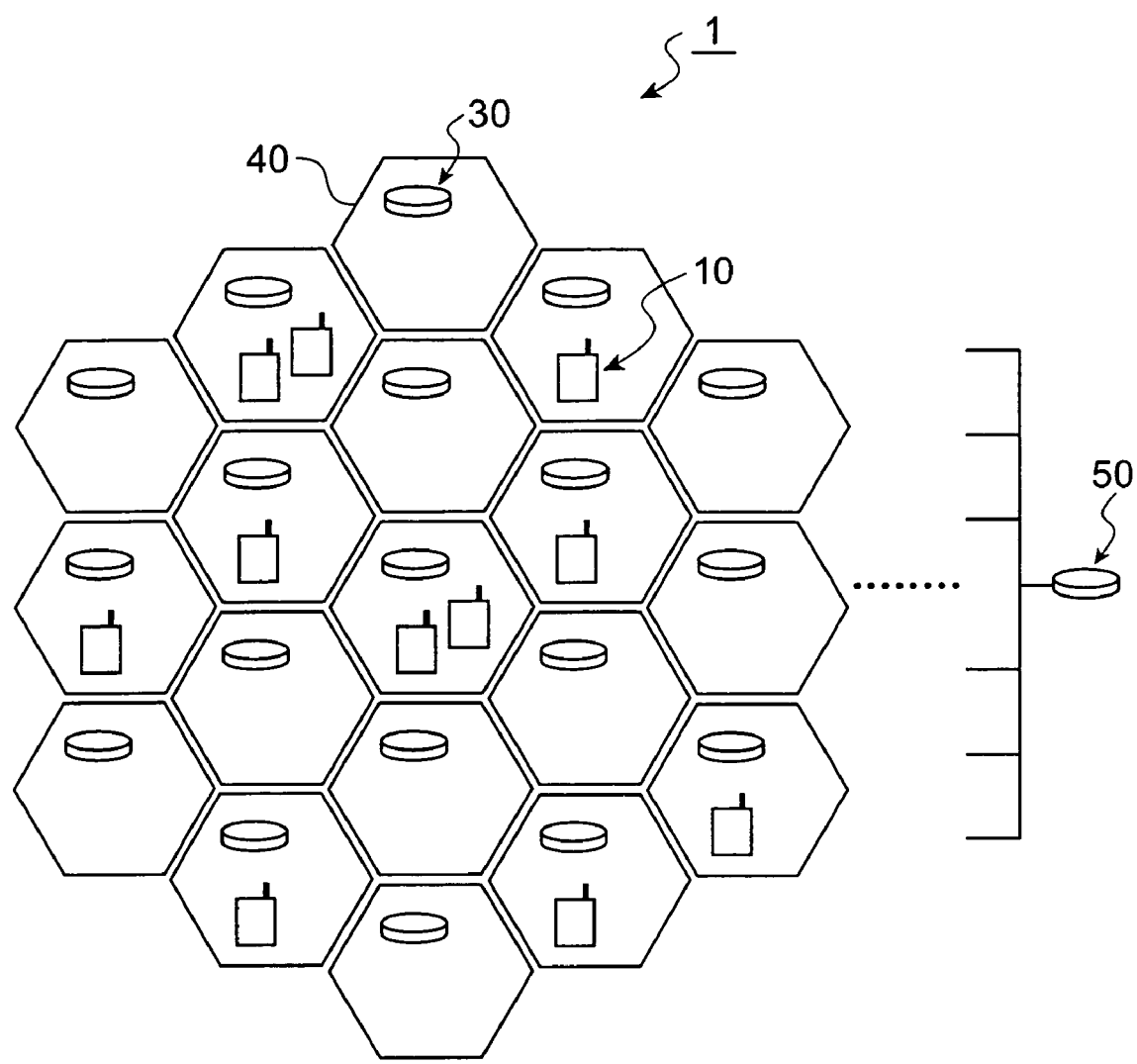
FIG. 1 is a configuration diagram of a communication system in the first embodiment.

FIG. 1 shows the configuration of communication system 1 in the first embodiment. As shown in FIG. 1, communication system 1 is configured to implement packet communication based on Internet Protocol version 6 and is comprised of mobile node (MN) 10; mobility anchor point (MAP) 50 managing movement of mobile node 10; and access router (AR) 30 as an access node for providing a link for connection of MN 10 to a packet communication network. Each AR 30 is connected through a wire or wireless link to MAP 50. In communication system 1 of the first embodiment, each access node is comprised of only AR 30. Region 40 in FIG. 1 indicates a range in which each AR provides its access link.

Figure 2:
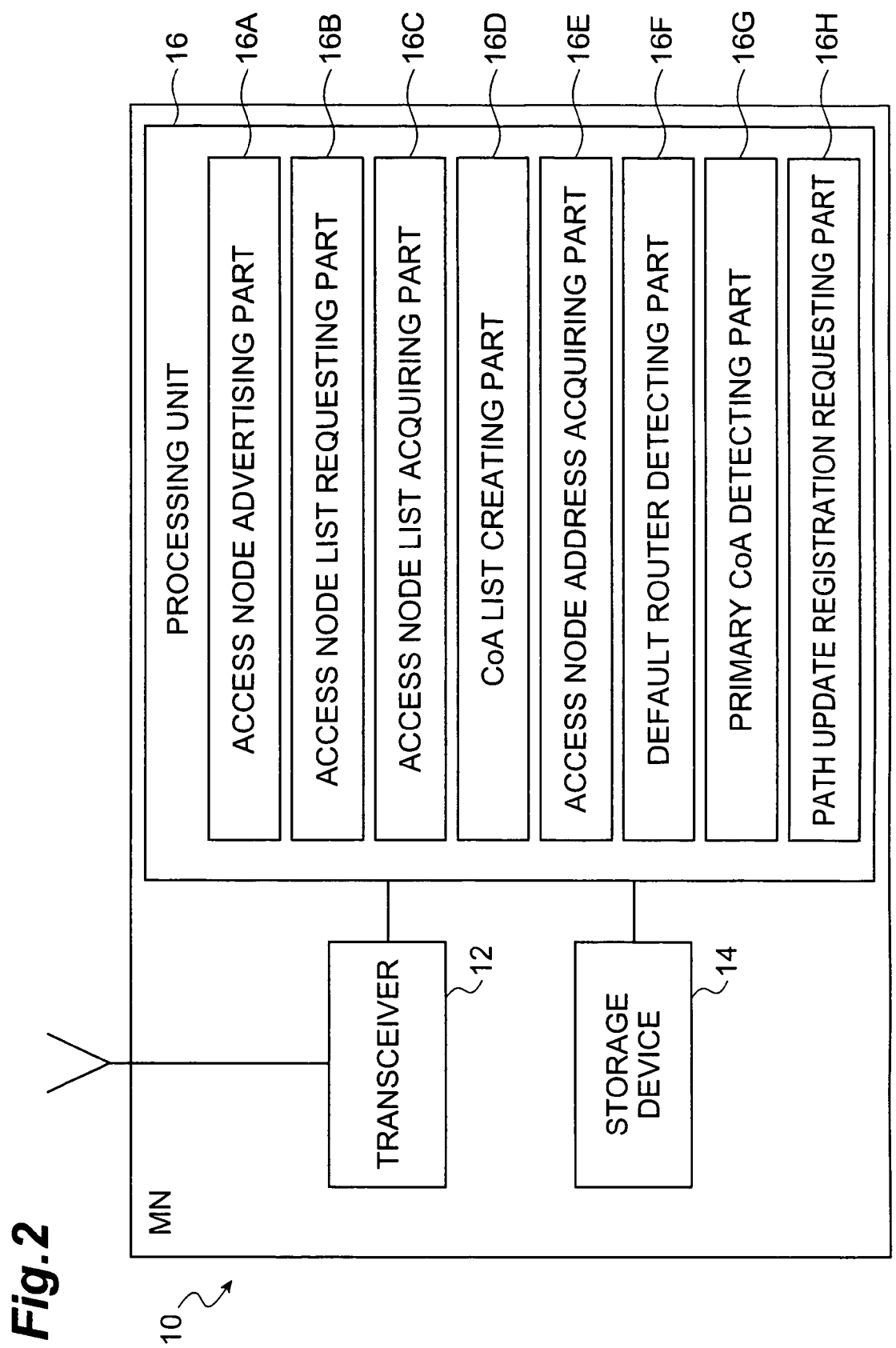
FIG. 2 is a configuration diagram of a mobile node (MN).

FIG. 2 shows the configuration of MN 10. As shown in FIG. 2, MN 10 is comprised of transceiver 12 for transmission and reception of information; storage device 14; and processing unit 16 consisting of constituent parts performing a variety of processes described later. The processing unit 16 is comprised of access node advertising part 16A which advertises MAP 50 of the network layer address and the data link layer address of AR 30; access node list requesting part 16B which requests MAP 50 to send an access node list; access node list acquiring part 16C which acquires the access node list from MAP 50; CoA list creating part 16D which creates a CoA list; access node address acquiring part 16E which acquires the data link layer address of AR 30 on a link connected after migration, from an L2 trigger; default router detecting part 16F which detects a default router from the access node list; primary CoA detecting part 16G which detects a primary CoA (PCoA) from the CoA list; and path update registration requesting part 16H which requests MAP 50 to update a binding between the PCOA and the home address (HoA), by a binding update message (BU).

Figure 3:
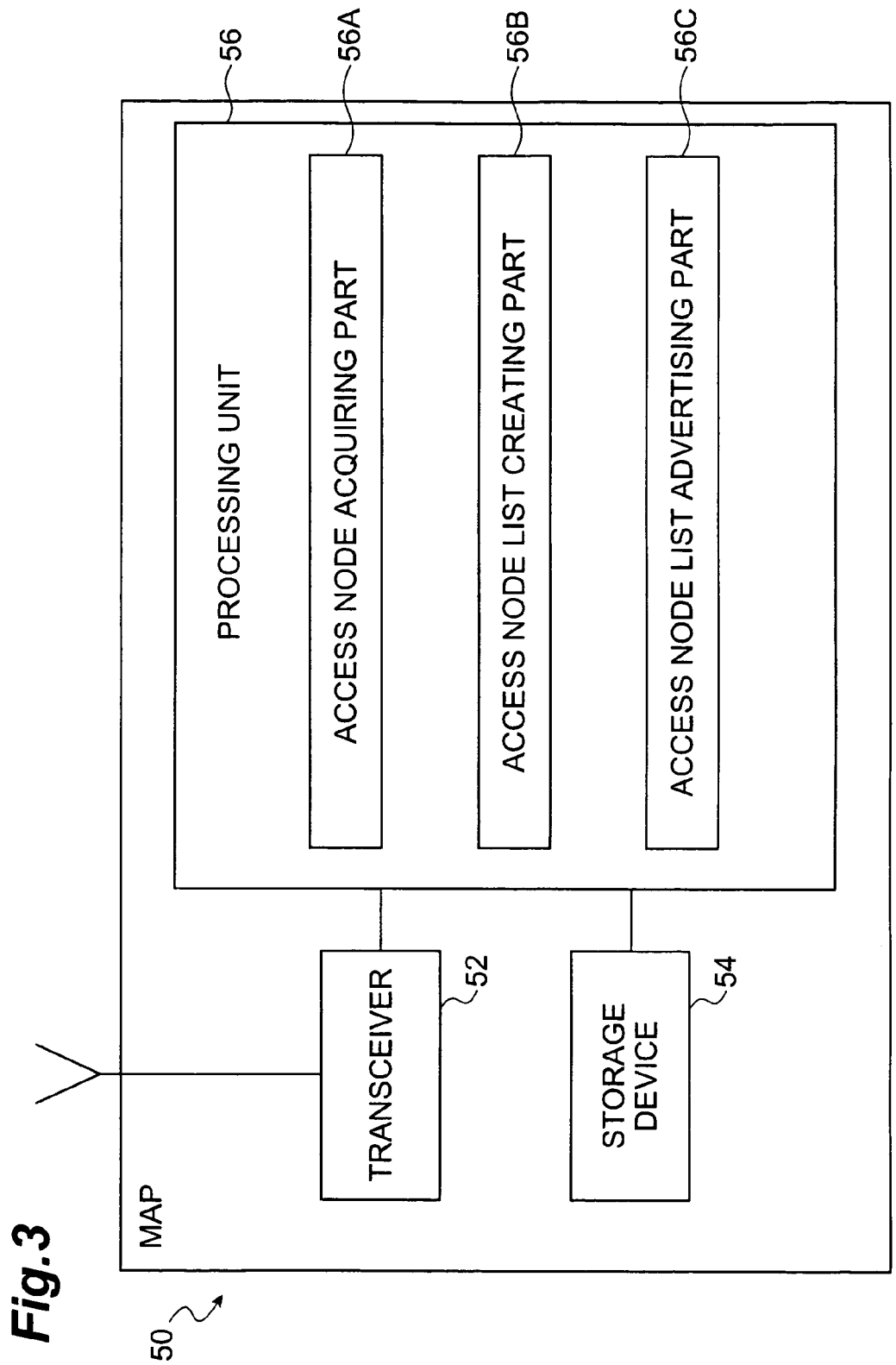
FIG. 3 is a configuration diagram of a mobility anchor point (MAP).

FIG. 3 shows the configuration of MAP 50. As shown in FIG. 3, MAP 50 is comprised of transceiver 52 for transmission and reception of information; storage device 54; and processing unit 56 consisting of constituent parts performing a variety of processes described later. The processing unit 56 is comprised of access node acquiring part 56A which acquires the network layer address and data link layer address of AR 30; access node list creating part 56B which creates the access node list containing the network layer address and data link layer address of AR 30 as one entry; and access node list advertising part 56C which advertises MN 10 of the access node list.

Formats of Various Messages and Lists

Figure 4:
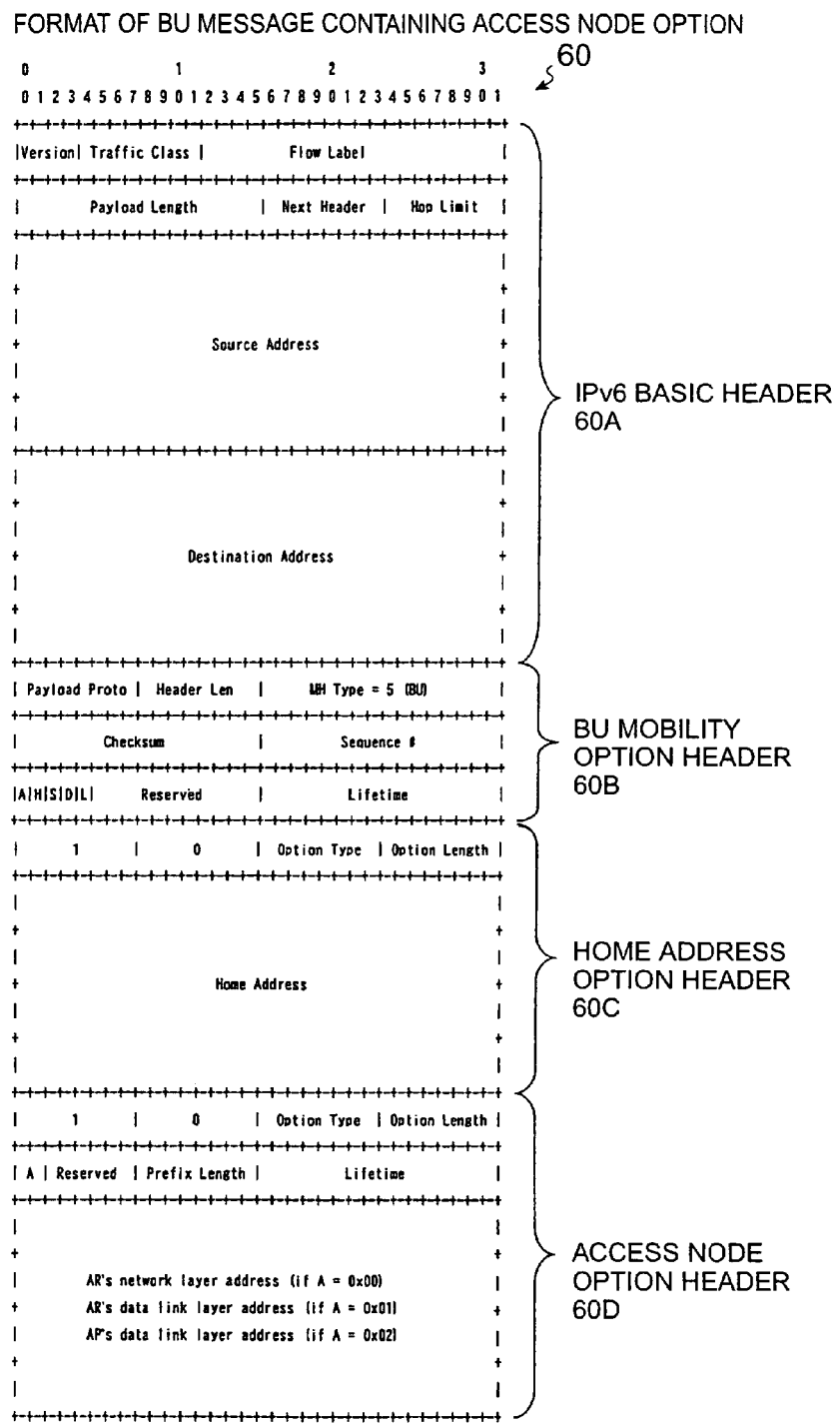
FIG. 4 is a diagram showing a format of a BU message accompanied by an access node option header.

The access node advertising part 16A of MN 10 appends newly defined access node option header 60D to BU 60 of FIG. 4 which MN 10 is to transmit to MAP 50. Here is outlined BU 60 of FIG. 4. BU 60 is used for access node advertising part 16A to advertise MAP 50 of the network layer address and data link layer address of AR 30, and the data link layer address of AP (it is, however, noted that only the network layer address and data link layer address of AR 30 are advertised of in the first embodiment). BU 60 is comprised of IPv6 basic header 60A, BU mobility option header 60B, home address option header 60C, and access node option header 60D. Only one address can be advertised of by one access node option. Therefore, for example, where the network layer address and data link layer address of AR 30 are advertised of, two access node option headers are appended to BU 60.

Among fields of the above access node option header 60D, an "Option Type" field represents a field for distinguishing an access node option, and is assigned an arbitrary integer. An "Option Length" field represents a field about the header length of the access node option, and an A flag field represents a field about a type of the address stored in the field of the header. For example, where the A flag is 0, it indicates that the address stored is the network layer address of AR 30; where the A flag is 1, it indicates that the address stored is the data link layer address of AR 30; where the A flag is 2, it indicates that the address stored is the data link layer address of AP. A "Prefix Length" field is used only if the address advertised of is the network layer address, and represents a field about the prefix length of the address. A "Lifetime" field represents a field about a valid duration of the address advertised of.

Access node list requesting part 16B requests MAP 50 to send the access node list when the mobile node changes MAP 50 with which the binding of its own is registered or when the valid duration of an entry in the access node list held by the mobile node, expires. On this occasion, it transmits ICMP (Internet Control Message Protocol) Router Address Solicitation message 62 shown in FIG. 5, through transceiver 12 to request the access node list. At this time the access node list requesting part 16B may also be configured to transmit BU 64 containing access node list request flag shown in FIG. 6, to MAP 50 to request the access node list.

Figure 5:
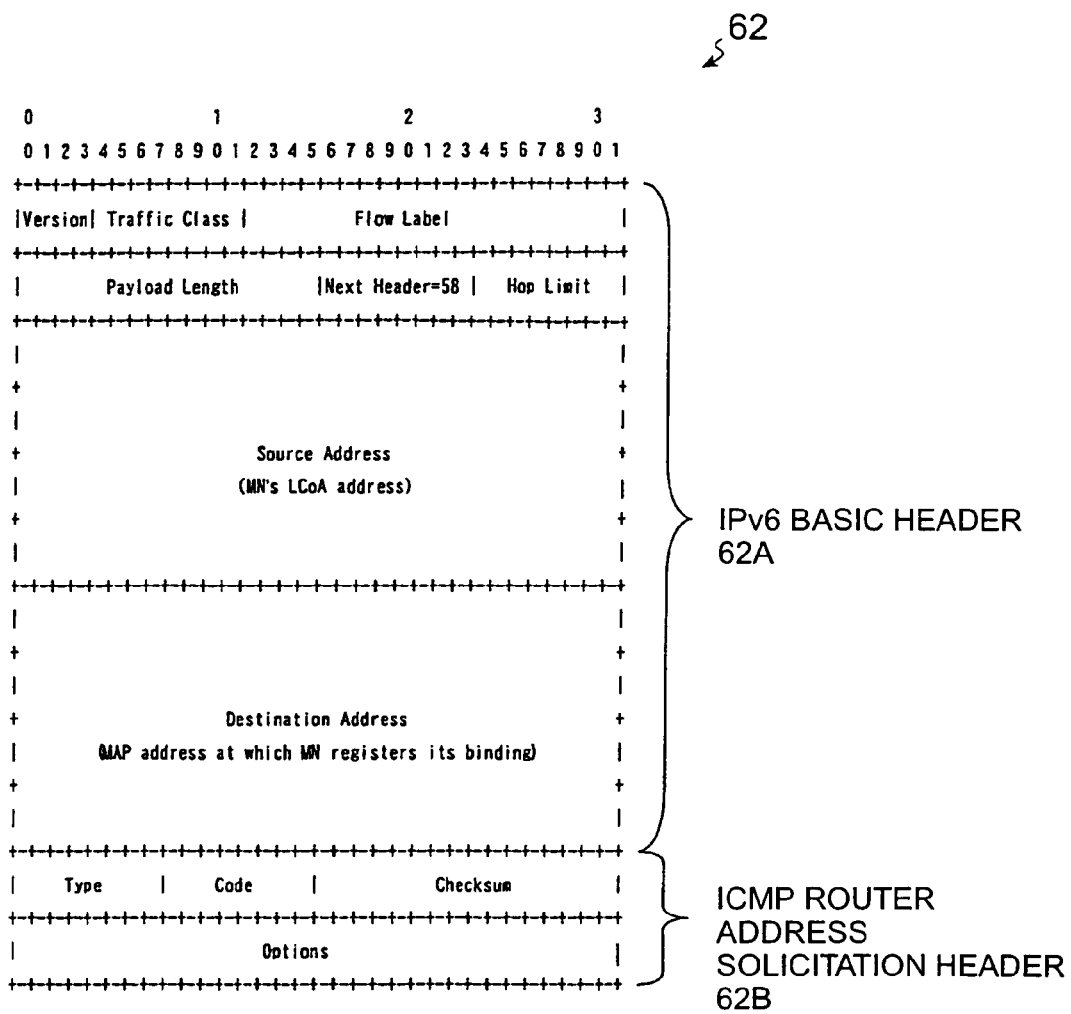
FIG. 5 is a diagram showing a format of an ICMP Router Address Solicitation message.

The ICMP Router Address Solicitation message 62 is comprised, as shown in FIG. 5, of IPv6 basic header 62A and ICMP Router Address Solicitation header 62B, and a "Next Header" field of IPv6 basic header 62A stores information indicating that the next header is a header associated with ICMPv6 (e.g., "58"). In ICMP Router Address Solicitation header 62B, a "Type" field is a field for indicating that the header is an ICMP Router Address Solicitation, and is assigned an arbitrary integer. In an "Options" field, it is possible to use the options defined in ICMPv6 such as a source link layer address option and others.

Figure 6:
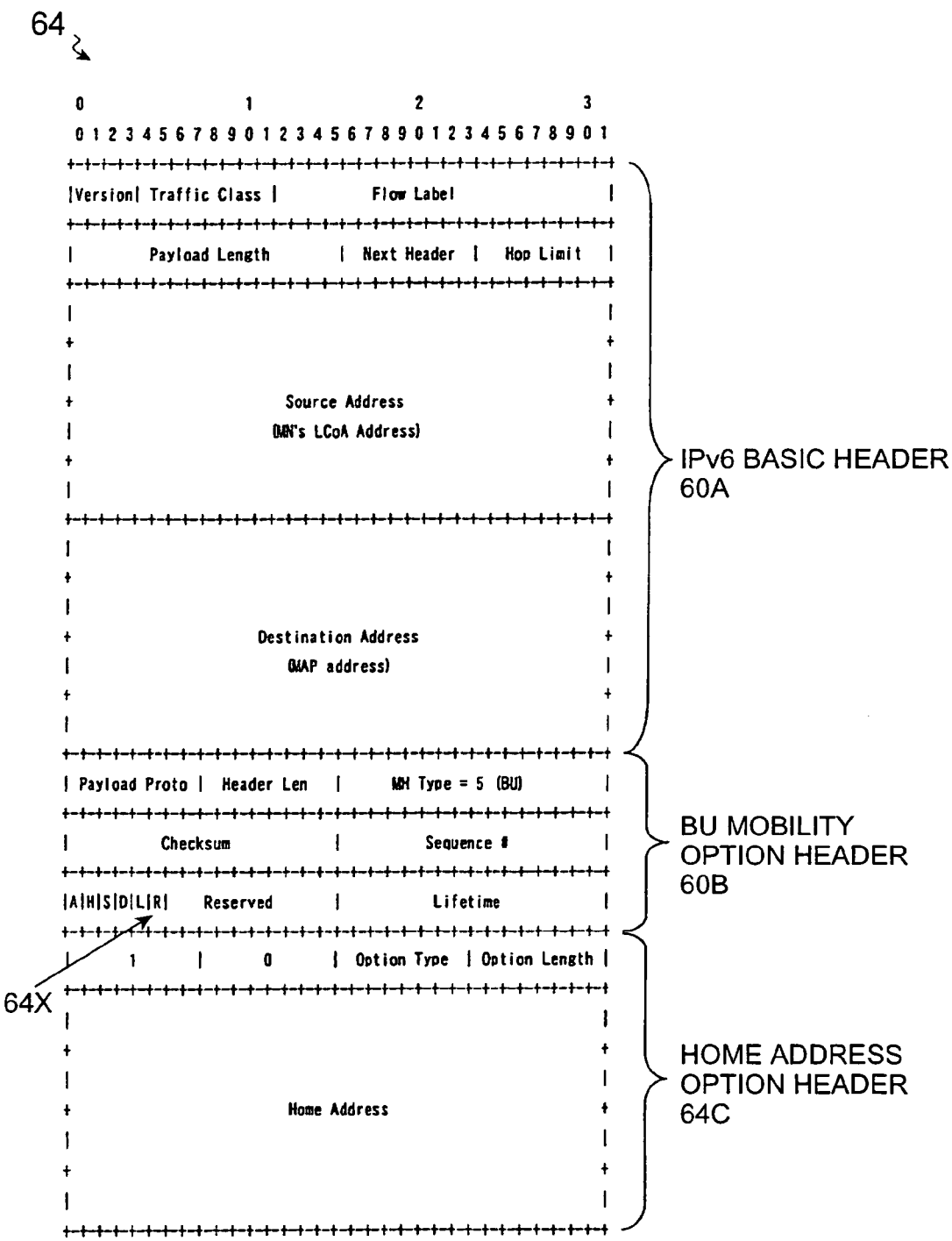
FIG. 6 is a diagram showing a format of a BU message with an access node list request flag.

BU 64 containing access node list request flag is comprised, as shown in FIG. 6, of IPv6 basic header 64A, BU mobility option header 64B, and home address option header 64C. New R flag 64X is set in BU mobility option header 64B among the headers. Where this R flag 64X is 1, MN 10 requests MAP 50 to send the access node list. Where the R flag 64X is 0, MN 10 does not request MAP 50 to send the access node list.

Access node list acquiring part 16C acquires the access node list created by MAP 50, from the MAP 50, and the access node list herein can be made up, for example, as a list containing the network layer address and data link layer address of the AR sent from MN 10 to MAP, as one entry, as shown in FIG. 7. Access node list acquiring part 16C receives an ICMP Router Address Advertisement (FIG. 8) through transceiver 12 and acquires the access node list entered in a predetermined field in the ICMP Router Address Advertisement. Access node list acquiring part 16C may also be configured to receive a BA containing Router Address Advertisement option (FIG. 9) from MAP 50 to acquire the access node list.

Figure 8:
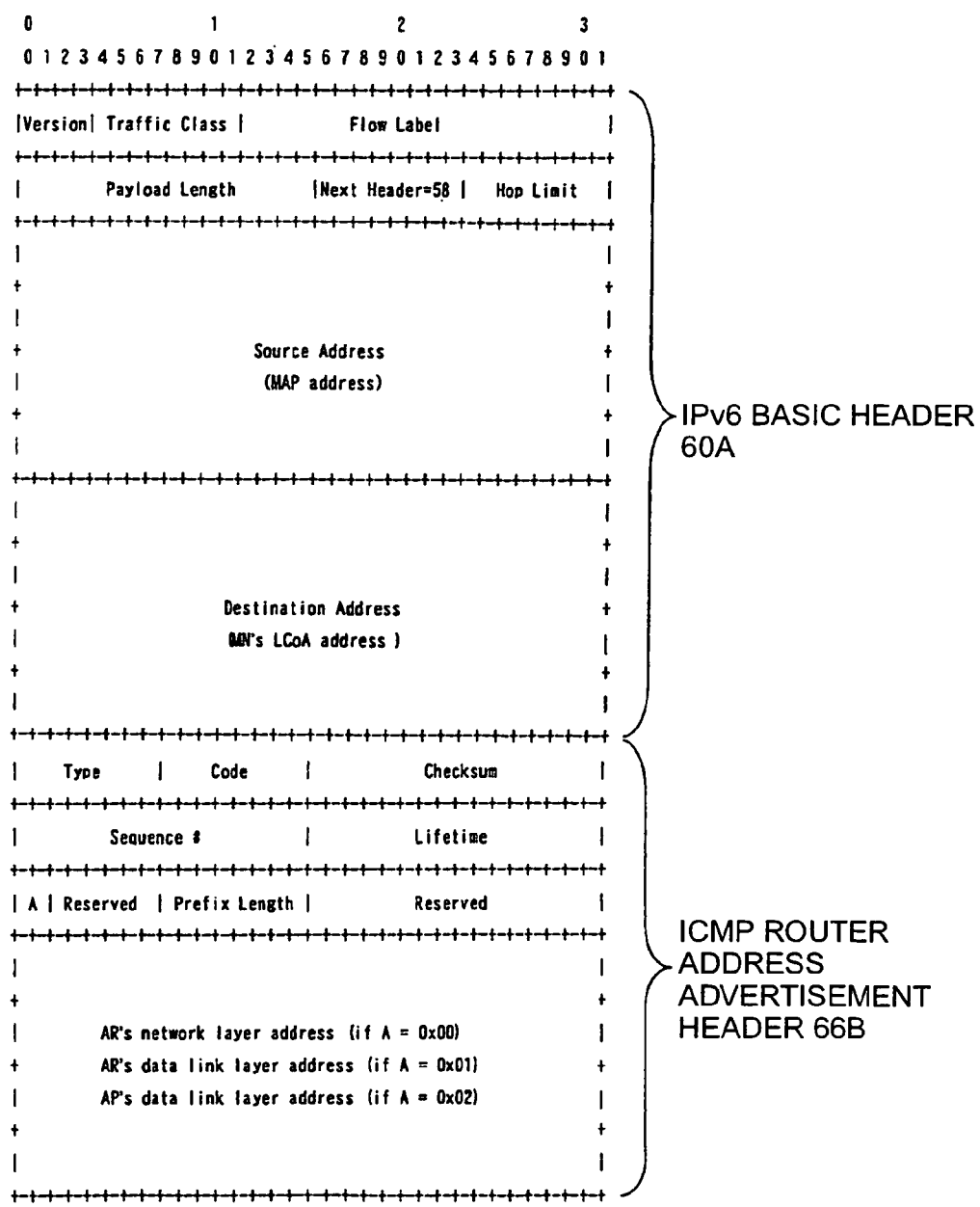
FIG. 8 is a diagram showing a format of an ICMP Router Address Advertisement message.

As shown in FIG. 8, ICMP Router Address Advertisement message 66 is comprised of IPv6 basic header 66A and ICMP Router Address Advertisement header 66B, and a "Next Header" field of IPv6 basic header 66A stores information indicating that the next header is a header associated with ICMPv6 (e.g., "58"). In ICMP Router Address Advertisement header 66B, a "Type" field represents a field for indicating that the header is an ICMP Router Address Advertisement option, and is assigned an arbitrary integer. A "Sequence" field stores a sequence number assigned according to an order of entries in the access node list held by MAP 50. The network layer address and data link layer address of AR 30 and the data link layer address of AP with an identical sequence number indicate that they are addresses of AR and AP existing on the same access link. A "Lifetime" field represents a field about a valid duration of the address advertised of.

An A flag field represents a field about a type of the address stored in the field of the header. For example, where the A flag is 0, it indicates that the address stored is the network layer address of AR 30; where the A flag is 1, it indicates that the address stored is the data link layer address of AR 30; where the A flag is 2, it indicates that the address stored is the data link layer address of AP. A "Prefix Length" field is used only when the address advertised of is the network layer address, and represents a field about the prefix length of the address.

Figure 9:
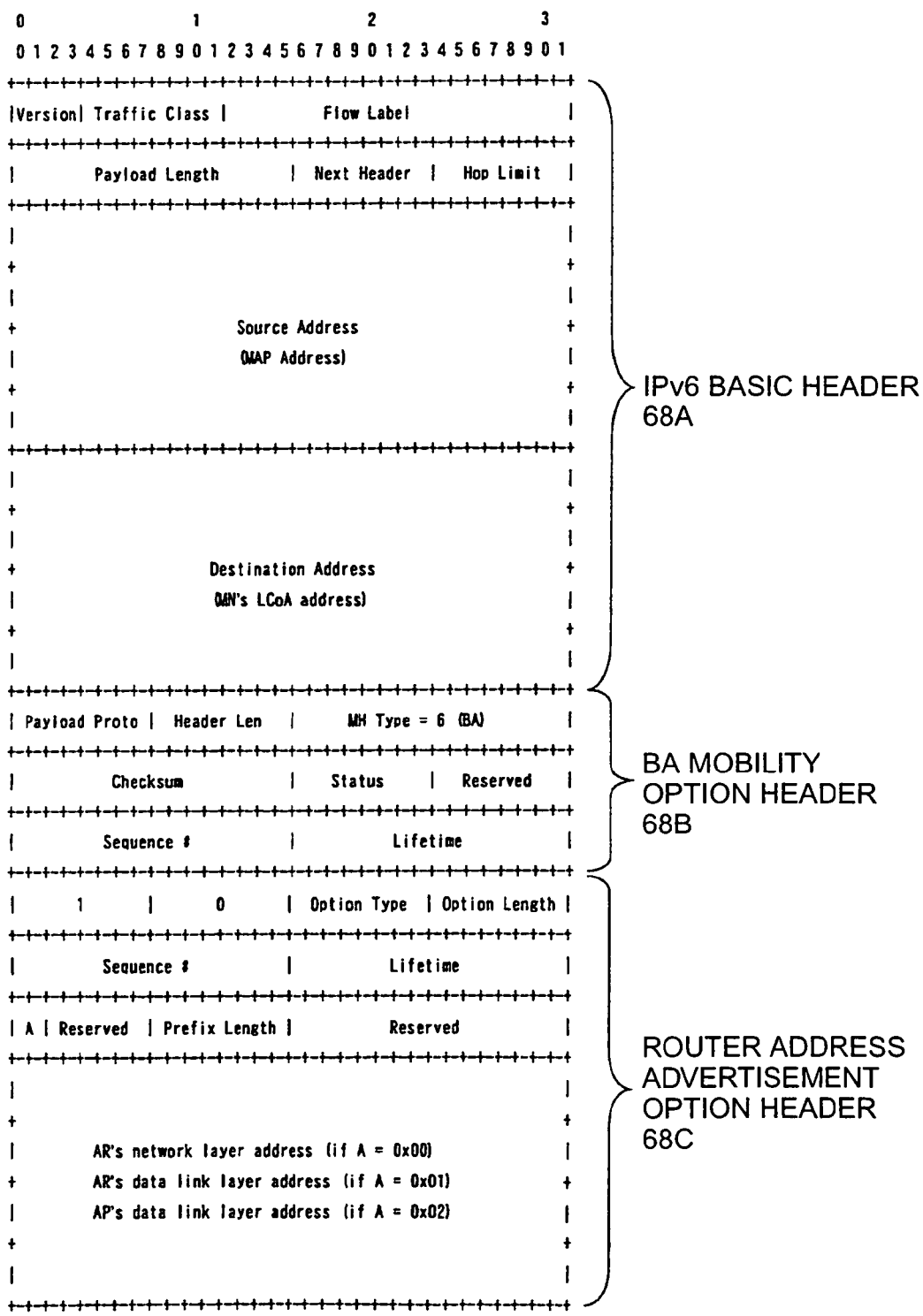
FIG. 9 is a diagram showing a format of a BA message with a Router Address Advertisement option.

As shown in FIG. 9, BA 68 containing Router Address Advertisement option is comprised of IPv6 basic header 68A, BA mobility option header 68B, and newly defined Router Address Advertisement option header 68C. An "Option Type" field in Router Address Advertisement option header 68C is a field for indicating that the header is a Router Address Advertisement option, and is assigned an arbitrary integer. An "Option Length" field stores header length information of the Router Address Advertisement option. In a "Sequence" field, a sequence number is assigned according to an order of entries in the access node list held by MAP 50. The network layer address and the data link layer address of AR 30 and the data link layer address of AP with an identical sequence number represent addresses of AR and AP existing on the same access link. A "Lifetime" field is a field about the valid duration of the address advertised of.

An A flag field represents a field about a type of the address stored in the field of the header. For example, where the A flag is 0, it indicates that the address stored is the network layer address of AR 30; where the A flag is 1, it indicates that the address stored is the data link layer address of AR 30; where the A flag is 2, it indicates that the address stored is the data link layer address of AP. A "Prefix Length" field is used only if the address advertised of is the network layer address, and is a field about the prefix length of the address.

CoA list creating part 16D creates CoAs corresponding to subnet prefixes of ARs 30 entered as entries in the access node list advertised of by MAP 50, and enters the CoAs thus created, into the care-of address list (CoA list) of FIG. 10. As shown in the same figure, the CoA list contains information of the sequence number, CoA, and valid duration of each CoA, and a primary CoA described later is given information indicating "primary CoA."

Contents of Processing in First Embodiment

The contents of processing in the first embodiment will be described below.

FIG. 11 shows the operation flow of MN 10. In MN 10, at A01 in FIG. 11 the access node advertising part 16A sends the BU to advertise MAP 50 of the network layer address and data link layer address of AR 30 presently connected to MN 10. On this occasion, access node advertising part 16A appends access node option headers to the BU directed to MAP 50, enters the network layer address and data link layer address of AR 30 into the predetermined field of the access node option headers, and then transmits the BU to MAP 50.

At A02 the access node list requesting part 16B then transmits the ICMP Router Address Solicitation (FIG. 5) through transceiver 12 to MAP 50 to request advertisement of the access node list. This request is made when MN 10 changes MAP 50 with which the binding of its own is registered, or when the valid duration of an entry in the access node list held by MN 10 expires. Access node list requesting part 16B may also be configured to transmit the BU containing access node list request flag (FIG. 6) to MAP 50 to request the access node list.

At A03 the access node list acquiring part 16C then receives the ICMP Router Address Advertisement (FIG. 8) from MAP 50 through transceiver 12 and acquires the access node list (FIG. 7) entered in the predetermined field in the ICMP Router Address Advertisement. Access node list acquiring part 16C may also be configured to receive the BA containing Router Address Advertisement option (FIG. 9) from MAP 50 to acquire the access node list.

At A04 the CoA list creating part 16D then creates CoAs corresponding to the subnet prefixes of ARs 30 entered as entries in the access node list advertised of by MAP 50, and enters the CoAs thus created, into the CoA list (FIG. 10). The order of CoAs entered in the CoA list of FIG. 10 corresponds with the order of sequence numbers in the access node list. The acquired access node list is retained in storage device 14.

At A05 the access node address acquiring part 16E then acquires the data link layer address of AR 30 existing on the link after a change of the connected node with migration of MN 10, from an L2 trigger. The L2 trigger is a message for advertising the IP layer that the data link layer of MN 10 established a connection in the data link layer, and the data link layer address of AR 30 is stored in a predetermined field of the L2 trigger.

At A06 the default router detecting part 16F then searches the access node list for an entry corresponding with the data link layer address of AR 30 acquired, and sets an AR of the entry obtained by the search, as a default router.

At A07 the primary CoA detecting part 16G then searches the CoA list retained in the storage device 14, for a CoA with the network prefix corresponding to the subnet prefix of the default router set above, and sets the CoA obtained by the search, as a primary care-of address (PCoA).

At A08 the path update registration requesting part 16H then transmits the BU through transceiver 12 to MAP 50, in order to register a binding between the PCOA and HoA of MN 10 with MAP 50. The above completes the processing of MN 10.

FIG. 12 shows the operation flow of MAP 50. In MAP 50, at B01 in FIG. 12, access node acquiring part 56A, receiving the BU from MN 10 through transceiver 52, acquires the network layer address and data link layer address of AR 30 entered in the access node options appended to the BU.

At B02-B04 the access node list creating part 56B then creates the access node list (FIG. 7) containing the network layer address and data link layer address of the acquired AR 30 as one entry, and retains the list in storage device 54 (access node list creating function). In this connection, the addresses of AR 30 sent to MAP 50 are advertised of by MNs 10 using the MAP 50, and thus a MAP domain of the MAP is defined as a set of ARs 30 advertised of by MNs 10. If at least one MN 10 is connected to each of all the ARs 30 in the MAP domain, the MAP 50 can acquire the addresses of all the ARs 30. Therefore, the MAP 50 can create the access node list in which all the ARs 30 in the MAP domain are entered as entries.

Specifically, at B02 the access node list creating part 56B searches the access node list for the same entry as the AR 30 advertised of by the BU, and determines whether it is found. When the same entry as the AR 30 advertised of by the BU is found in the access node list, the access node list creating part 56B updates only the valid duration of each address advertised of (B03). When the same entry as the AR 30 advertised of is not found, the access node list creating part 56B newly registers a new entry of the AR addresses (B04).

At next B05 the access node list advertising part 56C then advertises MN 10 of the access node list retained in storage device 54. At this time, however, MAP 50 sends the access node list when it receives the ICMP Router Address Solicitation (FIG. 5) or the BU containing access node list request flag (FIG. 6) from MN 10 through transceiver 52 whereby MN 10 requests the access node list. MAP 50 may be configured to regularly send the access node list to MN 10 entered in the binding held in the storage device 54 of its own.

At above B05 MAP 50 sends the ICMP Router Address Advertisement (FIG. 8) in which entries of access nodes to be advertised of are entered in the predetermined field, through transceiver 52 to MN 10 to advertise MN 10 of the access node list. It may also transmit the BA containing Router Address Advertisement option (FIG. 9) through transceiver 52 to MN 10 to advertise MN 10 of the access node list.

Figure 13B:
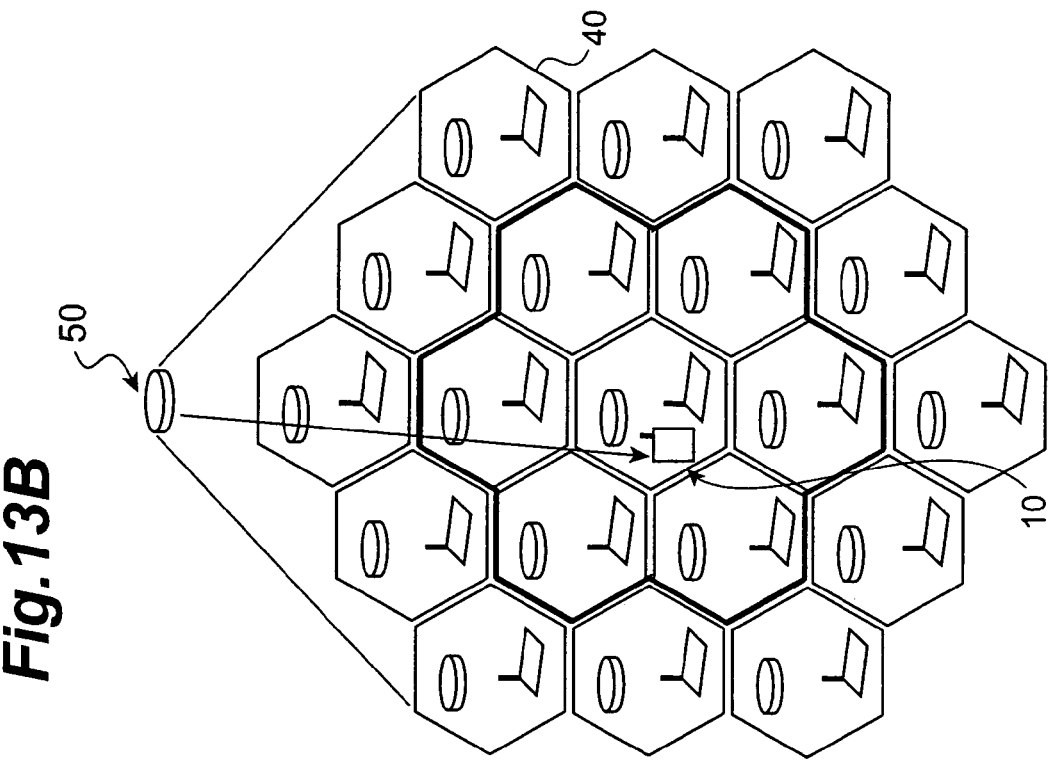
FIG. 13B is a diagram showing a mode in which MAP advertises MN of only AR entries existing around connected AR of target MN to be advertised of the access node list.
Figure 13A:
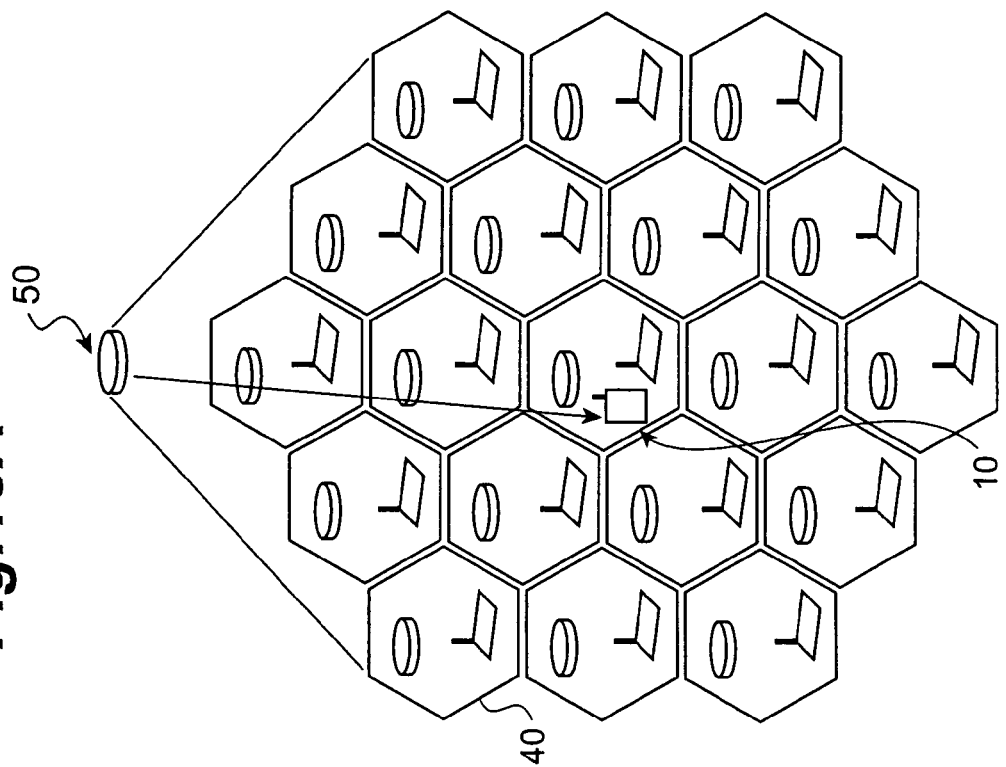
FIG. 13A is a diagram showing a mode in which MAP advertises MN of all entries in the access node list.

MAP 50 may advertise MN 10 of all the entries in the access node list retained by itself, as shown in FIG. 13A, or may advertise MN 10 of only entries of ARs existing around the AR connected to the MN 10 as an object for advertisement of the access node list, as shown in FIG. 13B.

According to the first embodiment as described above, in the communication system where only ARs exist as access nodes, MN creates a list of CoAs corresponding to the respective access nodes (only ARs herein) entered in the access node list of access nodes existing on neighboring links, each CoA being used as a destination of MN at a link on which an access node corresponding thereto exists. Then MN, when changing the connected link to another, detects a default router on the basis of the data link layer address of the access node existing on the link after the change, with reference to the access node list, detects a CoA with the network prefix corresponding with the subnet prefix of the default router, as a primary CoA, and requests the MAP to update the path of the packet addressed to the mobile node, by the primary CoA. In this manner, upon a change of the connected link, the MN is able to instantaneously send the request for update of the CoA to MAP, whereby it is feasible to significantly decrease the CoA update duration necessary between establishment of the connection of MN to the data link layer and completion of the update of the CoA.

Second Embodiment

[Configuration of Communication System]

Figure 14:
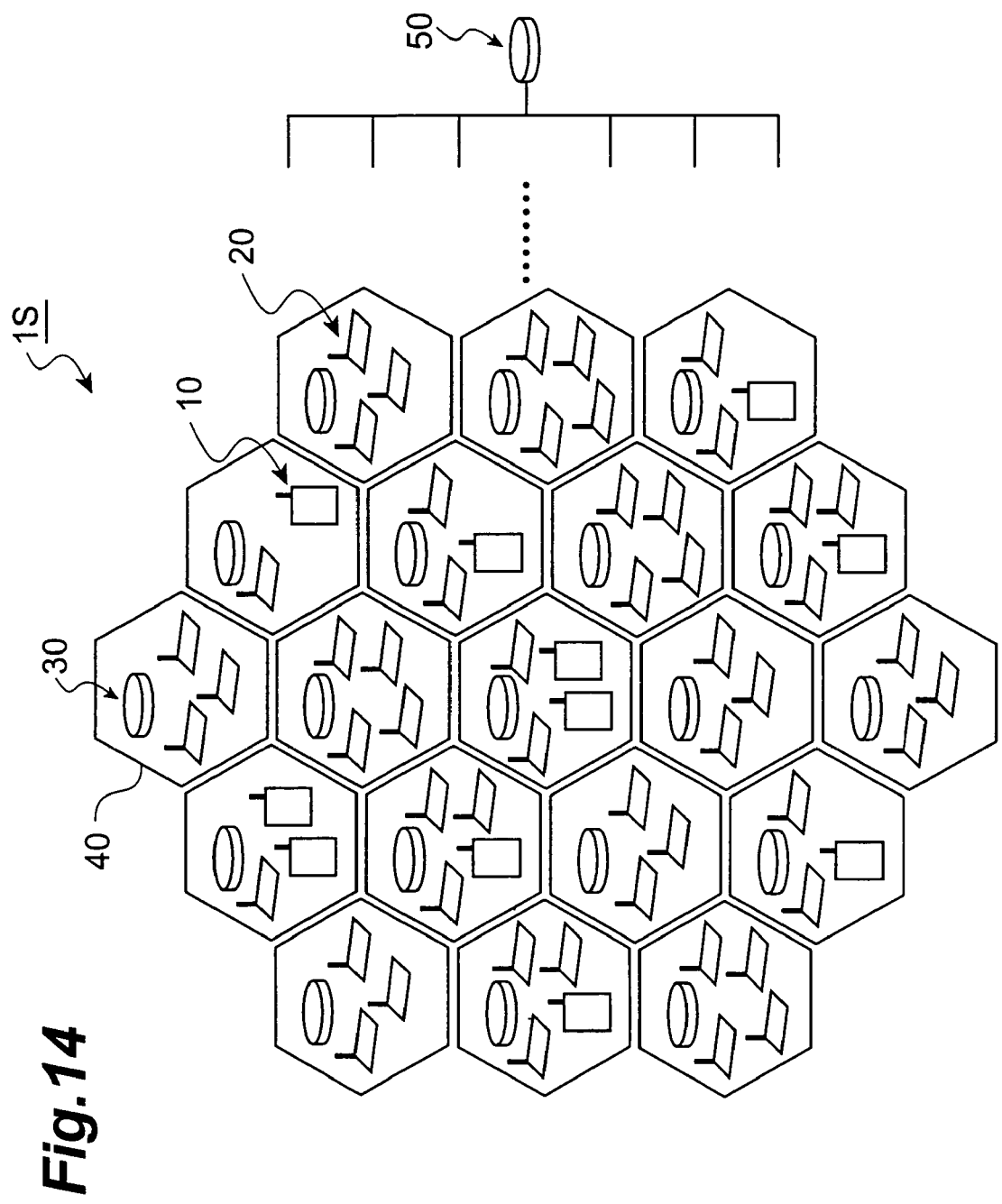
FIG. 14 is a configuration diagram of a communication system in the second embodiment.

FIG. 14 shows the configuration of communication system 1S in the second embodiment. As shown in FIG. 14, communication system 1S is configured to implement packet communication based on Internet Protocol version 6 and is comprised of mobile node (MN) 10; mobility anchor point (MAP) 50 which manages movement of mobile node 10; access router (AR) 30 and access point (AP) 20 as an access node for providing a link for connection of MN 10 to a packet communication network. Namely, communication system 1S in the second embodiment is different from communication system 1 in the first embodiment in that each access node is not comprised of only AR 30 but is comprised of AR 30 and AP 20.

The configurations of MN 10 and MAP 50 (FIG. 2 and FIG. 3) are much the same as those in the first embodiment. It is, however, noted that access node advertising part 16A in FIG. 2 advertises MAP 50 of the network layer address and data link layer address of AR 30, and the data link layer address of AP 20. Access node address acquiring part 16E acquires the data link layer address of AP 20 on the link connected after the migration, from the L2 trigger. Default router detecting part 16F searches the access node list retained in storage device 14, for an entry corresponding with the data link layer address of AP 20 acquired, detects the network layer address and data link layer address of AR 30 in the same entry as the data link layer address of AP 20, based on the entry acquired by the search, and sets the obtained AR 30 as a default router.

Access node acquiring part 56A in FIG. 3 acquires the network layer address and data link layer address of AR 30, and the data link layer address of AP 20 from MN 10. Access node list creating part 56B creates the access node list containing the network layer address and data link layer address of AR 30, and the data link layer address of AP 20 as one entry.

In the second embodiment the formats of the various messages and lists are similar to those in the first embodiment, but the format of the access node list is different from that in the first embodiment. Namely, as shown in FIG. 15, the access node list is made up as a list containing the network layer address and data link layer address of AR 30, and the data link layer address of AP 20, which were sent from MN 10 to MAP 50, as one entry.

Contents of Processing in Second Embodiment

The contents of processing in the second embodiment will be described below.

FIG. 16 shows the operation flow of MN 10. In MN 10, at A11 in FIG. 16, access node advertising part 16A sends the BU to advertise MAP 50 of the network layer address and data link layer address of AR 30 and the data link layer address of AP 20 currently connected to MN 10. At this time, access node advertising part 16A appends the access node option headers to the BU directed to MAP 50, enters the network layer address and data link layer address of AR 30 and the data link layer address of AP 20 into the predetermined field of the access node option headers, and then transmits the BU to MAP 50.

At A12 the access node list requesting part 16B then transmits the ICMP Router Address Solicitation (FIG. 5) to MAP 50 through transceiver 12 to request advertisement of the access node list. This request is made when MN changes MAP 50 with which the binding of its own is registered, and when the valid duration of an entry in the access node list held by MN expires. The access node list requesting part 16B may also be configured to transmit the BU containing access node list request flag (FIG. 6) to MAP 50 to request the access node list.

At A13 the access node list acquiring part 16C then receives the ICMP Router Address Advertisement (FIG. 8) from MAP 50 through transceiver 12 to acquire the access node list (FIG. 15) entered in the predetermined field in the ICMP Router Address Advertisement. Access node list acquiring part 16C receives the BA containing Router Address Advertisement option (FIG. 9) from MAP 50 to acquire the access node list.

At A14 the CoA list creating part 16D then creates CoAs corresponding to the subnet prefixes of ARs 30 entered in the access node list advertised of by MAP 50, and enters the CoAs thus created, into the CoA list (FIG. 10). The order of CoAs entered in the CoA list of FIG. 10 corresponds with the order of sequence numbers in the access node list. The acquired access node list is retained in storage device 14.

At A15 the access node address acquiring part 16E then acquires the data link layer address of AP 20 existing on the link, from the L2 trigger, after switching of the connected link with movement of MN 10. The L2 trigger is a message for advertising the IP layer that the data link layer of MN 10 established a connection in the data link layer, and the data link layer address of AP 20 is stored in the predetermined field of the L2 trigger.

At A16 the default router detecting part 16F then searches the access node list for an entry matching the data link layer address of AP 20 acquired, and sets an AR of the entry obtained by the search, as a default router.

At A17 the primary CoA detecting part 16G then searches the CoA list retained in storage device 14, for a CoA with the network prefix corresponding to the subnet prefix of the default router thus set, and sets the CoA obtained by the search, as a primary care-of address (PCoA).

At A18 the path update registration requesting part 16H then transmits the BU to MAP 50 through transceiver 12, in order to register the binding between the PCOA and HoA of MN 10 with MAP 50. The above completes the processing of MN 10.

FIG. 17 shows the operation flow of MAP 50. In MAP 50, at B11 in FIG. 17, the access node acquiring part 56A, receiving the BU from MN 10 through transceiver 52, acquires the network layer address and data link layer address of AR 30 and the data link layer address of AP 20 entered in the access node options appended to the BU.

At B12-B14 the access node list creating part 56B then creates the access node list (FIG. 15) containing the network layer address and data link layer address of AR 30 and the data link layer address of AP 20 thus acquired, as one entry, and retains it in storage device 54 (access node list creating function). In this connection, since the addresses of AR 30 and AP 20 sent to MAP 50 are advertised of by MNs 10 using the MAP 50, a MAP domain of the MAP is defined as a set of ARs 30 and APs 20 advertised of by MNs 10. If at least one MN 10 is connected to each of all the APs 20 in the MAP domain, the MAP can acquire the entries of all the AR addresses and AP addresses. Therefore, MAP 50 can create the access node list containing the entries of all the ARs 30 and APs 20 in the MAP domain.

Specifically, at B12 the access node list creating part 56B searches the access node list for the same entry as AR 30 or AP 20 advertised of by the BU, and determines whether the entry is found. When the same entry as AR 30 or AP 20 advertised of by the BU is found in the access node list, the access node list creating part 56B updates only the valid duration of each address acquired (B13); if the same entry as AR 30 or AP 20 advertised of is not found, the access node list creating part 56B newly registers the entry of the network layer address and data link layer address of AR 30 and the data link layer address of AP 20 thus acquired (B14).

At next B15 the access node list advertising part 56C then advertises MN 10 of the access node list retained in storage device 54. At this time, however, MAP 50 advertises MN 10 of the access node list when it receives the ICMP Router Address Solicitation (FIG. 5) or the BU containing access node list request flag (FIG. 6) from MN 10 through transceiver 52 whereby MN 10 requests the access node list. MAP 50 may also be configured to regularly advertise MN 10 entered in the binding retained in storage device 54 of its own, of the access node list.

At above B15 MAP 50 transmits the ICMP Router Address Advertisement (FIG. 8) in which the entries of access nodes to be advertised of are entered in the predetermined field, to MN 10 through transceiver 52 to advertise MN 10 of the access node list. MAP 50 may also be configured to transmit the BA containing Router Address Advertisement option (FIG. 9) to MN 10 through transceiver 52 to advertise MN 10 of the access node list.

MAP 50 may advertise MN 10 of all the entries in the access node list retained by itself, as shown in FIG. 13A, or may advertise MN 10 of only the entries of ARs existing around the AR connected to MN 10 as a target for advertisement of the access node list, as shown in FIG. 13B.

According to the second embodiment as described above, in the communication system where AR and AP exist as an access node, MN creates a list of CoAs corresponding to the respective access nodes (ARs and APs herein) entered in the access node list of access nodes existing on neighboring links, each CoA being used as a destination of MN at a link on which an access node corresponding thereto exists. With a change of the connected link, MN detects the default router on the basis of the data link layer address of the access node existing on the link after the change, with reference to the access node list, detects the CoA with the network prefix corresponding with the subnet prefix of the default router, as a primary CoA, and requests the MAP to update the path of the packet directed to the mobile node, by the primary CoA. In this manner, with a change of the connected link, the MN is able to instantaneously send the request for update of the CoA to MAP, whereby it is feasible to significantly decrease the CoA update duration necessary between establishment of the connection of MN to the data link layer and completion of the update of the CoA.

According to the present invention, as described above, the mobile node creates a list of CoAs corresponding to the respective access nodes entered in the access node list of access nodes existing on the neighboring links, each CoA being used as a destination of the mobile node at a link on which an access node corresponding thereto exists. With a change of the connected link, the mobile node detects the default router on the basis of the data link layer address of the access node existing on the link after the change, with reference to the access node list, detects the CoA with the network prefix corresponding with the subnet prefix of the default router, as a primary CoA, and requests the mobility control apparatus to update the path of the packet directed to the mobile node, by the primary CoA. Therefore, the mobile node is able to instantaneously send the request for the update of the CoA to the mobility control apparatus upon a change of the connected link, whereby it is feasible to significantly decrease the CoA update duration necessary between establishment of the connection of the mobile node to the data link layer and completion of the update of the CoA.

What is claimed is:

1. A mobile node making up a communication system based on Internet Protocol version 6, together with a mobility control apparatus for managing movement of the mobile node, and with an access node providing a link for the mobile node to be connected to a packet communication network, the mobile node comprising:

list acquiring means for acquiring a list of access nodes existing on neighboring links to the link used for connection by the mobile node;

care-of address (CoA) list creating means for creating a list of CoAs corresponding to the respective access nodes entered in the acquired access node list, each CoA being used as a destination address of the mobile node at a link on which an access node corresponding thereto exists;

access node address acquiring means for, where the mobile node changes the connected link to another link, acquiring a data link layer address of an access node existing on the link after the change;

default router detecting means for detecting a default router on the basis of the acquired data link layer address with reference to the access node list;

primary CoA detecting means for detecting a CoA with a network prefix corresponding with a subnet prefix of the default router, as a primary CoA from the list of CoAs; and path update requesting means for requesting the mobility control apparatus to update a path of a packet addressed to the mobile node, by the primary CoA.

2. The mobile node according to claim 1, wherein the list acquiring means comprises: access node advertising means for advertising the mobility control apparatus of information about the access node existing on the link used for connection by the mobile node;

access node list requesting means for requesting the mobility control apparatus to send the list of access nodes existing on the neighboring links to the link used for connection by the mobile node; and access node list acquiring means for acquiring the list of access nodes on the neighboring links, which was created by the mobility control apparatus, from the mobility control apparatus.

3. The mobile node according to claim 2, wherein the access node advertising means enters the information about the access node existing on the link used for connection by the mobile node, into an access node option appended to a binding update message directed to the mobility control apparatus, thereby advertising the mobility control apparatus of the information about the access node.

4. The mobile node according to claim 2, wherein the access node list requesting means requests the list of access nodes existing in the neighborhood to the link used for connection by the mobile node, using a newly defined message, or a message field appended to a binding update message directed to the mobility control apparatus.

5. The mobile node according to claim 2, wherein the access node list acquiring means acquires the list of access nodes existing in the neighborhood to the link used for connection by the mobile node, using a newly defined message, or a message field appended to a binding acknowledgment message from the mobility control apparatus.

6. The mobile node according to claim 2, wherein, where the access node is an access router, the access node advertising means advertises the mobility control apparatus of a network layer address and a data link layer address of said access router as the information about the access node;
wherein, where the access node is comprised of an access router, and an access point for providing an access link for the mobile node, the access node advertising means advertises the mobility control apparatus of a network layer address and a data link layer address of said access router, and a data link layer address of said access point as the information about the access node.

7. The mobile node according to claim 6, wherein, where the access node is an access router, the access node address acquiring means acquires the data link layer address by using a predetermined information exchange message for exchange of information between an IP layer and a data link layer to advertise the IP layer of a data link layer address of the access router existing on the link after the change;
wherein, where the access node is comprised of an access router, and an access point for providing an access link for the mobile node, the access node address acquiring means acquires the data link layer address by using the predetermined information exchange message to advertise the IP layer of a data link layer address of the access point existing on the link after the change.

8. The mobile node according to claim 7, wherein, where the access node is an access router, the default router detecting means searches the access node list for an access router corresponding with the data link layer address of the access router acquired, and defines the access router obtained by the search, as a default router;
wherein, where the access node is comprised of an access router, and an access point for providing an access link for the mobile node, the default router detecting means searches the access node list for an access router existing on a subnet identical to that of an access point existing on the link after the change, with reference to the data link layer address of the access point acquired and the access node list, and defines the access router obtained by the search, as a default router.

9. A mobility control apparatus for managing movement of a mobile node on the basis of Internet Protocol version 6, the mobility control apparatus comprising:

access node acquiring means for acquiring information about an access node existing on a link used for connection by the mobile node;
access node list creating means for creating an access node list in which access nodes for providing an access link for the mobile node are registered;
access node list advertising means for advertising the mobile node of the access node list in a domain where the mobility control apparatus is managed; and
means for creating a care-of address (CoA) list in respective access nodes in the domain prior to the mobile node changing from a connected link to another link, wherein the CoA list provides a destination address of the mobile node at any link on which an access node corresponding thereto exists.

10. The mobility control apparatus according to claim 9, wherein the access node acquiring means acquires the information about the access node from an access node option appended to a binding update message from the mobile node.

11. The mobility control apparatus according to claim 9, wherein the access node list advertising means advertises the mobile node of the access node list, using a newly defined message or a message field appended to a binding acknowledgment message directed to the mobile node.

12. The mobility control apparatus according to claim 9, wherein the access node list advertising means advertises the mobile node of the access node list, said access node list including information registered about access nodes existing on all links for providing an access link for the mobile node.

13. The mobility control apparatus according to claim 9, wherein the access node list advertising means advertises the mobile node of the access node list, said access node list including information registered about access nodes on neighbor links to which the mobile node can move from the link used for connection at present, said connection at present having a possibility of not less than a predetermined reference.

14. The mobility control apparatus according to claim 12, wherein, where the access node is an access router, the access node acquiring means acquires a network layer address and a data link layer address of the access router as the information about the access node;
wherein, where the access node is comprised of an access router, and an access point for providing an access link for the mobile node, the access node acquiring means acquires a network layer address and a data link layer address of the access router, and a data link layer address of the access point as the information about the access node.

15. The mobility control apparatus according to claim 14, wherein, where the access node is an access router, the access node list creating means creates the access node list containing a network layer address and a data link layer address of the access router as one entry;
wherein, where the access node is comprised of an access router, and an access point for providing an access link for the mobile node, the access node list creating means creates the access node list containing a network layer address and a data link layer address of the access router, and a data link layer address of the access point as one entry.

16. A communication control method in a mobile node making up a communication system based on Internet Protocol version 6, together with a mobility control apparatus for managing movement of the mobile node, and with an access node providing a link for the mobile node to be connected to a packet communication network, the communication control method comprising:
- a list acquiring step of acquiring a list of access nodes existing on neighboring links to the link used for connection by the mobile node;
- a care-of address (CoA) list creating step of creating a list of CoAs corresponding to the respective access nodes entered in the acquired access node list, each CoA being used as a destination address of the mobile node at a link on which an access node corresponding thereto exists;
- an access node address acquiring step of, where the mobile node changes the connected link to another link, acquiring a data link layer address of an access node existing on the link after the change;
- a default router detecting step of detecting a default router on the basis of the acquired data link layer address with reference to the access node list;
- a primary CoA detecting step of detecting a CoA with a network prefix corresponding with a subnet prefix of the default router, as a primary CoA from the list of CoAs; and
- a path update requesting step of requesting the mobility control apparatus to update a path of a packet addressed to the mobile node, by the primary CoA.

17. A communication control method in a communication system configured to implement packet communication based on Internet Protocol version 6 and comprising a mobile node, a mobility control apparatus for managing movement of the mobile node, and an access node for providing a link for the mobile node to be connected to a packet communication network, the communication control method comprising:
- an access node advertising step wherein the mobile node advertises the mobility control apparatus of information about the access node existing on the link used for connection by the mobile node;
- an access node acquiring step wherein the mobility control apparatus acquires the information about the access node from the mobile node;
- an access node list creating step wherein the mobility control apparatus creates an access node list in which access nodes for providing an access link for the mobile node are registered, based on the information about the access node;
- an access node list requesting step wherein the mobile node requests the mobility control apparatus to send a list of access nodes existing on neighboring links to the link used for connection by the mobile node;
- an access node list advertising step wherein the mobility control apparatus receives the request for the access node list from the mobile node and advertises the mobile node of the access node list of access nodes existing on the neighboring links; and
- an access node list acquiring step wherein the mobile node acquires the access node list of access nodes on the neighboring links from the mobility control apparatus.

18. A communication system configured to implement packet communication based on Internet Protocol version 6 and comprising a mobile node, a mobility control apparatus for managing movement of the mobile node, and an access node for providing a link for the mobile node to be connected to a packet communication network,
wherein the mobile node comprises:
- list acquiring means for acquiring a list of access nodes existing on neighboring links to the link used for connection by the mobile node;
- care-of address (CoA) list creating means for creating a list of CoAs corresponding to the respective access nodes entered in the acquired access node list, each CoA being used as a destination address of the mobile node at a link on which an access node corresponding thereto exists;
- access node address acquiring means for, where the mobile node changes the connected link to another link, acquiring a data link layer address of an access node existing on the link after the change;
- default router detecting means for detecting a default router on the basis of the acquired data link layer address with reference to the access node list;
- primary CoA detecting means for detecting a CoA with a network prefix corresponding with a subnet prefix of the default router, as a primary CoA from the list of CoAs; and
- path update requesting means for requesting the mobility control apparatus to update a path of a packet addressed to the mobile node, by the primary CoA.

19. The communication system according to claim 18, wherein the list acquiring means of the mobile node comprises:
- access node advertising means for advertising the mobility control apparatus of information about the access node existing on the link used for connection by the mobile node;
- access node list requesting means for requesting the mobility control apparatus to send the list of access nodes existing on the neighboring links to the link used for connection by the mobile node; and
- access node list acquiring means for acquiring the access node list of access nodes existing on the neighboring links, from the mobility control apparatus;

wherein the mobility control apparatus comprises:
- access node acquiring means for acquiring the information about the access node from the mobile node;
- access node list creating means for creating an access node list in which access nodes for providing an access link for the mobile node are registered, based on the information about the access node; and
- access node list advertising means for receiving the request for the access node list from the mobile node and advertises the mobile node of the access node list of access nodes existing on the neighboring links.

20. The mobile node according to claim 4, wherein a data format adopted in the newly defined message is comprised of a basic header portion based on Internet Protocol version 6, and an extended header portion,
wherein said basic header portion comprises:
- a next header configuration field for indicating that a next header is a header about ICMP version 6;
- a source address field for storing a CoA of the mobile node; and
- a destination address field for storing an address of the mobility control apparatus with which the mobile node registers a binding;

wherein the extended header portion comprises:
a type field for identifying the message as an ICMP router address solicitation message.

21. The mobile node according to claim 5, wherein a data format adopted in the newly defined message is comprised of a basic header portion based on Internet Protocol version 6, and an extended header portion, wherein said basic header portion comprises:
a next header configuration field for indicating that a next header is a header about ICMP version 6;
a source address field for storing an address of the mobility control apparatus; and
a destination address field for storing a CoA of the mobile node;
wherein the extended header portion comprises:
a type field for identifying the message as an JCMP router address advertisement message;
a sequence number field for storing a sequence number given according to an order of entries in the access node list held by the mobility control apparatus;
a valid duration field for storing valid duration information of an address advertised of;
an address storage field for storing one of a network layer address and a data link layer address of an access router, and a data link layer address of an access point; and
a type field for indicating that the address stored in the address storage field is one of the network layer address and the data link layer address of the access router, and the data link layer address of the access point.

* * * * *